United States Patent
Shigeno et al.

(10) Patent No.: US 10,345,335 B2
(45) Date of Patent: Jul. 9, 2019

(54) SCANNING PROBE MICROSCOPE AND SCANNING METHOD THEREOF

(71) Applicant: Hitachi High-Tech Science Corporation, Minato-ku, Tokyo (JP)

(72) Inventors: Masatsugu Shigeno, Tokyo (JP); Kazutoshi Watanabe, Tokyo (JP); Hiroyoshi Yamamoto, Tokyo (JP)

(73) Assignee: Hitachi High-Tech Science Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/937,306

(22) Filed: Mar. 27, 2018

(65) Prior Publication Data

US 2018/0284151 A1 Oct. 4, 2018

(30) Foreign Application Priority Data

Mar. 28, 2017 (JP) .................... 2017-063530

(51) Int. Cl.
*G01Q 10/04* (2010.01)
*G01Q 60/34* (2010.01)

(52) U.S. Cl.
CPC .......... *G01Q 10/045* (2013.01); *G01Q 60/34* (2013.01)

(58) Field of Classification Search
CPC .............................. G01Q 10/045; G01G 60/34
USPC ........................................ 850/1, 2, 3, 4, 5, 7
See application file for complete search history.

(56) References Cited

U.S. PATENT DOCUMENTS

| | | |
|---|---|---|
| 2006/0219901 A1 | 10/2006 | Yasutake et al. |
| 2007/0266780 A1 | 11/2007 | Baba et al. |
| 2007/0277599 A1 | 12/2007 | Wang et al. |
| 2007/0295064 A1* | 12/2007 | Degertekin ............ B82Y 35/00 73/105 |
| 2008/0087820 A1* | 4/2008 | Kurenuma ............ B82Y 35/00 250/307 |
| 2012/0319679 A1* | 12/2012 | Heike ................... B82Y 35/00 324/207.13 |
| 2013/0205454 A1 | 8/2013 | Baba et al. |

(Continued)

FOREIGN PATENT DOCUMENTS

| | | |
|---|---|---|
| JP | H10-062158 A | 3/1998 |
| JP | 2001-033373 A | 2/2001 |
| JP | 2007-085764 A | 4/2007 |

OTHER PUBLICATIONS

Oct. 15, 2018—(EP) Extended search report—App 18164373.5.

*Primary Examiner* — Nicole M Ippolito
(74) *Attorney, Agent, or Firm* — Banner & Witcoff, Ltd.

(57) ABSTRACT

A scanning probe microscope has a cantilever having a probe at a tip of the cantilever, a driving unit that performs a separating operation for separating one of the sample and the probe from the other at a speed exceeding a response speed of the cantilever from a state where the probe is in contact with the surface of the sample, a determination unit that determines that the probe is separated from the surface of the sample when vibration of the cantilever at a predetermined amplitude is detected at a resonant frequency of the cantilever during the separating operation, and a driving control unit that stops the separating operation when the determination unit determines that the probe is separated from the surface of the sample and relatively moves the probe and the sample to a position where the probe is located on a next measuring point of the sample.

15 Claims, 20 Drawing Sheets

(56) References Cited

U.S. PATENT DOCUMENTS

2014/0092716 A1\* 4/2014 Saito ................ B82Y 35/00
369/53.38
2015/0338437 A1\* 11/2015 Stan ................. G01Q 210/00
850/1

\* cited by examiner

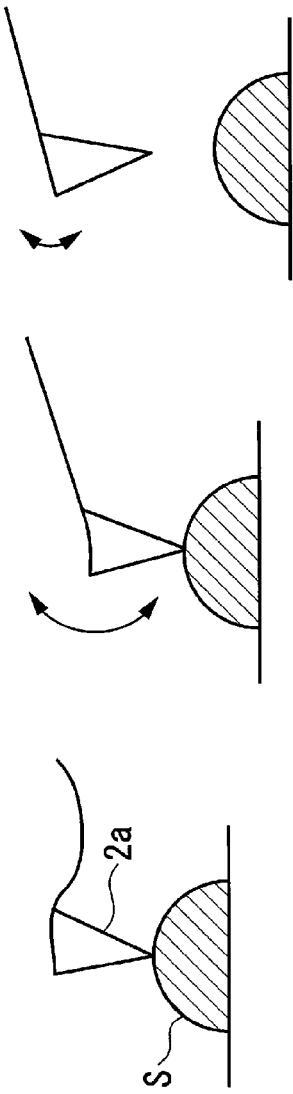
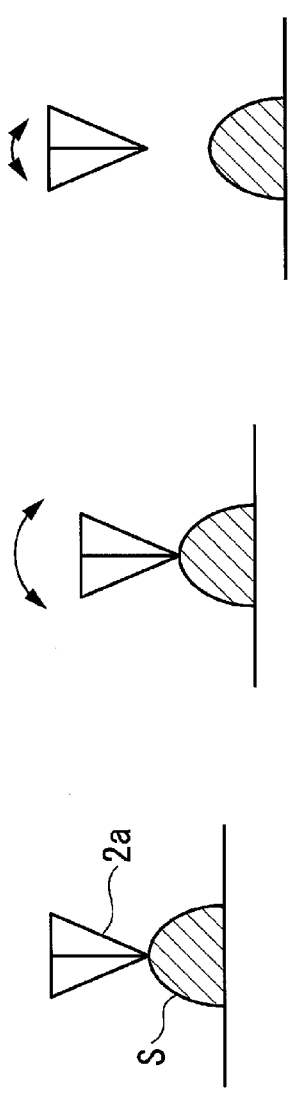
FIG. 18A
FIG. 18B

SCANNING PROBE MICROSCOPE AND SCANNING METHOD THEREOF

CROSS-REFERENCE TO RELATED APPLICATION

This application claims priority from Japanese Patent Application No. 2017-063530, filed on Mar. 28, 2017, the entire subject matters of which is incorporated herein by reference.

BACKGROUND

1. Field of the Invention

The present disclosure relates to a scanning probe microscope and a scanning method thereof.

2. Background Art

A scanning probe microscope is known in which a probe is continuously scanned on a surface of a sample while keeping an interaction (for example, amplitude of a cantilever or deflection of the cantilever) constant between the probe formed on a tip of the cantilever and the sample, thereby measuring an uneven shape of the sample surface (See JP-A-H10-62158.). In the scanning probe microscope disclosed in JP-A-H10-62158, since the probe and the sample are always in contact with each other, abrasion of the probe or damage of the sample may occur.

Meanwhile, JP-A-2001-33373 and JP-A-2007-85764 disclose a technique of intermittently scanning the sample surface by bringing the probe and the sample surface into contact with only a plurality of preset measuring points on the sample surface and measuring an uneven shape of the sample surface. In this intermittent measurement method, the probe is brought close to the surface of the sample from a position above the predetermined measuring point, and a height of the probe is measured when the probe is come in contact with the surface of the sample. Then, when the measurement is completed, the probe in contact with the surface of the sample is separated from the surface of the sample by the preset "separation distance" and is moved up to a position above the next measuring point. In this way, according to the intermittent measurement method, since the probe and the sample surface are in contact with each other only at the measuring point, as compared with JP-A-H10-62158, both them are in contact with each other at a minimum, and thus abrasion of the probe or damage of the sample can be reduced.

In particular, when the intermittent measurement method is carried out in a so-called contact mode in which the shape of the surface is measured while controlling the deflection of the cantilever to be constant, the scanning probe microscope repeatedly performs in general a step of bringing the probe close to the surface of the sample and measuring a height of the probe by determining that the probe is in contact with the surface of the sample when a force (deflection) applied to the cantilever becomes equal to or more than a certain value and a step of separating the probe from the sample by the "separation distance" and moving the probe up to the position above the next measurement position, thereby intermittently scanning the surface of the sample in general.

In order to separate the probe from the sample, the above-described "separation distance" needs to be set such that a force calculated by the product of a spring constant of the cantilever and the separation distance is larger than the adsorption power between the probe and the sample. However, the adsorption power between the probe and the sample varies depending on positions on the surface of the sample. Therefore, in the case of the sample in which the adsorption power between the probe and the sample differs greatly depending on the positions on the surface of the sample, the separation distance is set to have a sufficient margin so that the separation reliably occurs even at the position of the maximum adsorption power. Further, this value is a value, which indicates a separation distance, set to have the allowance based on experience of an operator in consideration of non-contact with a convex portion of the sample during movement to an upper position after separation of the probe from a certain measuring point. Nevertheless, in the case where the adsorption power is larger than a predicted value or the convex portion exists, the probe and the sample are brought into contact with each other and are damaged mutually because the separation distance is insufficient.

When the separation distance is set to a large value with a sufficient margin, the movement path to the position above the next measuring point becomes longer. As a result, the time for measuring the uneven shape of the surface of the sample becomes long as a whole, and the measurement efficiency of the uneven shape on the surface of the sample decreases.

SUMMARY

The object of the present disclosure is to provide a scanning probe microscope and a scanning method thereof that enable to improve measurement efficiency of an uneven shape on a surface of a sample.

According to an exemplary embodiment of the present disclosure, there is provided a scanning probe microscope in which a probe is brought into contact with a surface of a sample and the probe intermittently scans the surface of the sample, comprising:

a cantilever having the probe at a tip of the cantilever;

a driving unit configured to perform a separating operation for separating one of the sample and the probe from the other in a direction that the sample and the probe come apart each other, at a speed exceeding a response speed of the cantilever, from a state where the probe is in contact with the surface of the sample;

a determination unit configured to determine that the probe is separated from the surface of the sample in a case where vibration of the cantilever at a predetermined amplitude is detected at a resonant frequency of the cantilever during the separating operation; and a driving control unit configured to stop the separating operation by the driving unit at a moment of time when the determination unit determines that the probe is separated from the surface of the sample and relatively move the probe and the sample to a position where the probe is located on a next measuring point of the sample.

According to another exemplary embodiment of the present disclosure, there is provided a scanning probe microscope in which a probe is brought into contact with a surface of a sample and the probe scans the surface of the sample, comprising:

a cantilever having the probe at a tip of the cantilever;

a driving unit configured to perform a separating operation for separating one of the sample and the probe from the other in a direction that the sample and the probe come apart each other, at a speed not exceeding a response speed of the cantilever, from a state where the probe is in contact with the surface of the sample;

a determination unit configured to determines separation of the probe with respect to the surface of the sample, based on a speed change in a deflection direction of the cantilever, during the separating operation; and a driving control unit configured to stop the separating operation by the driving unit at a moment of time when the determination unit determines that the probe is separated from the surface of the sample and relatively move the probe and the sample to a position where the probe is located on a next measuring point of the sample.

According to another exemplary embodiment of the present disclosure, there is provided a scanning probe microscope in which a probe is brought into contact with a surface of a sample and the probe intermittently scans the surface of the sample, comprising:

a cantilever having the probe at a tip of the cantilever;

a driving unit configured to perform a separating operation for separating one of the sample and the probe from the other, from a state where the probe is in contact with the surface of the sample;

a determination unit configured to determine separation of the probe with respect to the surface of the sample, based on a change in amplitude of vibration in the cantilever or a change in vibration frequency of the vibration, during the separating operation; and a driving control unit configured to stop the separating operation by the driving unit at a moment of time when the determination unit determines that the probe is separated from the surface of the sample and relatively move the probe and the sample to a position where the probe is located on a next measuring point of the sample.

According to another exemplary embodiment of the present disclosure, there is provided a scanning probe microscope in which a probe is brought into contact with a surface of a sample and the probe intermittently scans the surface of the sample, comprising:

a cantilever having the probe at a tip of the cantilever;

a driving unit configured to perform a separating operation for separating one of the sample and the probe from the other, from a state where the probe is in contact with the surface of the sample;

an oscillation unit configured to relatively vibrate the sample and the cantilever at a predetermined frequency during the separating operation;

a determination unit configured to determine separation of the probe with respect to the surface of the sample, based on a change in amplitude at the predetermined frequency in a deflection direction or a twist direction of the cantilever, during the separating operation; and a driving control unit configured to stop the separating operation by the driving unit at a moment of time when the determination unit determines that the probe is separated from the surface of the sample and relatively move the probe and the sample to a position where the probe is located on a next measuring point of the sample.

According to another exemplary embodiment of the present disclosure, there is provided a scanning probe microscope in which a probe is brought into contact with a surface of a sample and the probe intermittently scans the surface of the sample, comprising:

a cantilever having the probe at a tip of the cantilever;

a driving unit configured to perform a separating operation for separating one of the sample and the probe from the other, from a state where the probe is in contact with the surface of the sample;

an oscillation unit configured to excites the cantilever at a resonant frequency during the separating operation;

a determination unit configured to determine separation of the probe with respect to the surface of the sample, based on a phase difference between a phase of vibration in a deflection direction or a twist direction of the cantilever and a phase of the resonant frequency excited by the oscillation unit, during the separating operation; and a driving control unit configured to stop the separating operation by the driving unit at a moment of time when the determination unit determines that the probe is separated from the surface of the sample and relatively move the probe and the sample to a position where the probe is located on a next measuring point of the sample.

According to another exemplary embodiment of the present disclosure, there is provided a probe scanning method of a scanning probe microscope in which a probe is brought into contact with a surface of a sample and the probe intermittently scans the surface of the sample, the method comprising:

a driving step, in a cantilever having the probe at a tip of the cantilever, of performing a separating operation for separating one of the sample and the probe from the other in a direction that the sample and the probe come apart each other, at a speed exceeding a response speed of the cantilever, from a state where the probe is in contact with the surface of the sample;

a determining step of determining that the probe is separated from the surface of the sample in a case where vibration of the cantilever at a predetermined amplitude is detected at a resonant frequency of the cantilever during the separating operation; and a driving control step of stopping the separating operation by the driving step at a moment of time when it is determined in the determining step that the probe is separated from the surface of the sample and relatively moving the probe and the sample to a position where the probe is located on a next measuring point of the sample.

According to another exemplary embodiment of the present disclosure, there is provided a probe scanning method of a scanning probe microscope in which a probe is brought into contact with a surface of a sample and the probe scans the surface of the sample, the method comprising:

a driving step, in a cantilever having the probe at a tip of the cantilever, of performing a separating operation for separating one of the sample and the probe from the other in a direction that the sample and the probe come apart each other, at a speed not exceeding a response speed of the cantilever, from a state where the probe is in contact with the surface of the sample;

a determining step of determining separation of the probe with respect to the surface of the sample, based on a speed change in a deflection direction of the cantilever, during the separating operation; and a driving control step of stopping the separating operation by the driving step at a moment of time when it is determined in the determining step that the probe is separated from the surface of the sample and relatively moving the probe and the sample to a position where the probe is located on a next measuring point of the sample.

According to the present disclosure, it is possible to avoid damage of a probe and a sample while eliminating the troublesome of consideration of unknown adsorption power or a height of a convex on a surface of the sample in setting of a separation distance. Therefore, it is possible to improve measurement efficiency of an uneven shape on the surface of the sample

BRIEF DESCRIPTION OF THE DRAWINGS

In the accompanying drawings:

FIGS. 18A and 18B are diagrams illustrating a method of detecting a decrease amount of an amplitude in a resonant frequency in a deflection direction or a twist direction, in the cantilever according to the fourth embodiment (FIG. 18A shows a case of vibrating the cantilever in the deflection direction and FIG. 18B shows a case of vibrating the cantilever in the twist direction);

DETAILED DESCRIPTION

Figure 1:
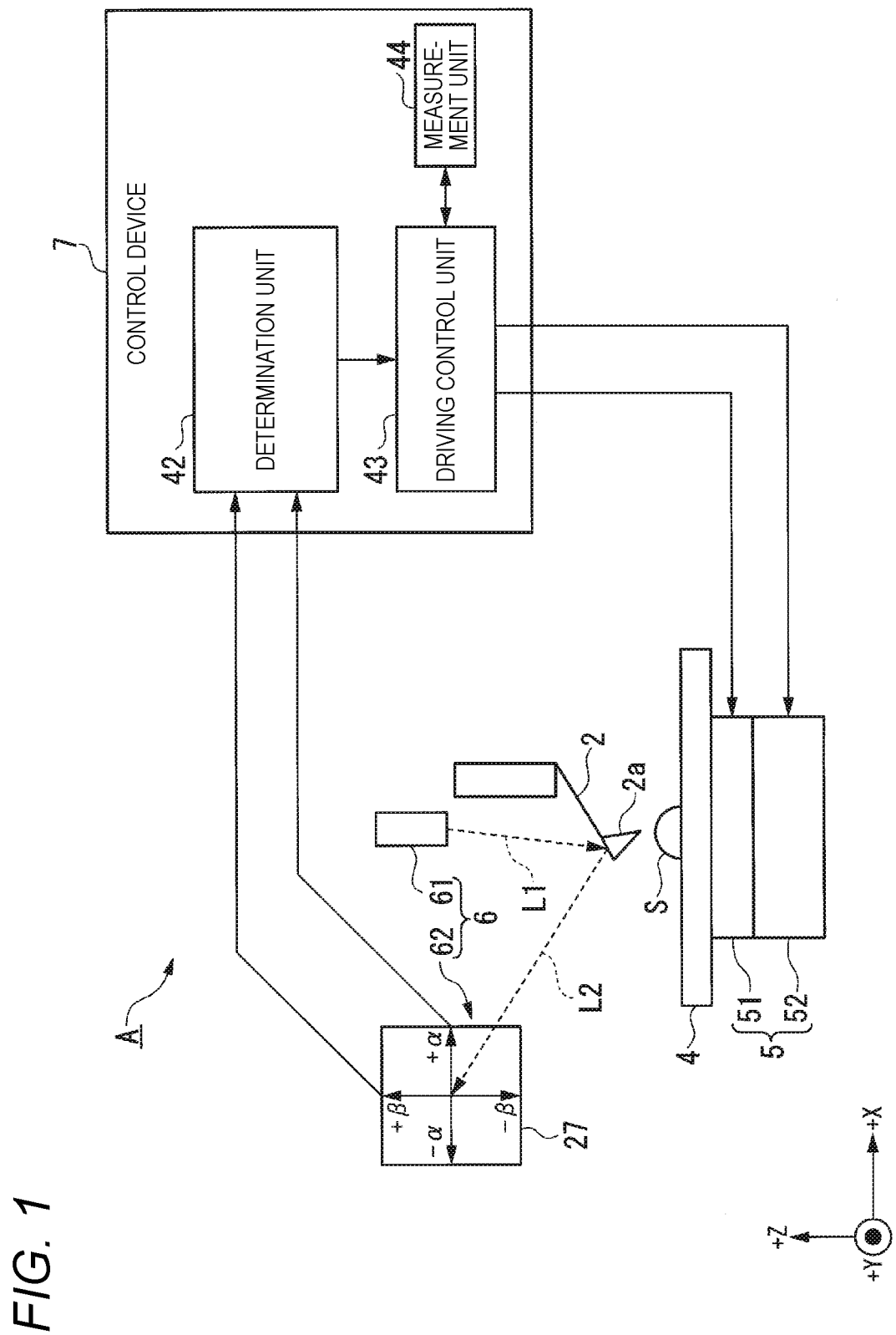
FIG. 1 is a diagram showing an example of a schematic configuration of a scanning probe microscope A according to a first embodiment.

A scanning probe microscope according to a first embodiment of the present disclosure is a scanning probe microscope using a method in which a probe is caused to contact with a sample surface thereby scanning the sample surface with the probe, that is, an intermittent measurement method.

Hereinafter, the scanning probe microscope according to the first embodiment of the present disclosure will be described with reference to drawings. In the drawings, the same or similar parts are denoted by the same reference signs, and redundant description may be omitted in some cases. In addition, shapes and sizes of elements in the drawings may be exaggerated for a clearer explanation.

First Embodiment

FIG. 1 is a diagram showing an example of a schematic configuration of a scanning probe microscope A according to a first embodiment. As shown in FIG. 1, the scanning probe microscope A includes a cantilever 2, a sample stage 4, a movement driving unit 5, a displacement detecting unit 6, and a control device 7.

The cantilever 2 includes a probe 2a on a tip. The cantilever 2 is configured such that a base end thereof is fixed and the tip is a free end. The cantilever 2 is an elastic lever member having a small spring constant K. When the probe 2a of the tip and the surface of a sample S (hereinafter, referred to as a "sample surface") contact with each other, deflection occurs according to pressing force by which the probe 2a of the tip presses the sample surface.

In addition, in a case where the probe 2a of the tip and the sample surface contact with each other and the sample surface has an inclination, a twist or a deflection according to the inclination of the sample surface and a support reaction of a supporting point that is a contact point between the probe 2a of the tip and the sample surface occurs on cantilever 2.

The movement driving unit 5 moves the probe 2a and sample S relative to each other in a three-dimensional direction. The movement driving unit 5 includes Z-direction driving device 51 (a driving unit) and an XY-scanner (a scanner) 52.

The sample stage 4 is mounted on the Z-direction driving device 51. The sample S is placed on the sample stage 4 so as to be disposed to face the probe 2a of cantilever 2.

The Z-direction driving device 51 moves the sample stage 4 in a direction (a Z direction) perpendicular to a horizontal surface. For example, the Z-direction driving device 51 is a piezoelectric element.

The Z-direction driving device 51 performs an approaching operation by which the sample surface approaches the probe 2a or a separating operation by which the sample S is moved in a direction being separated from the probe 2a by moving the sample stage 4 in the Z direction through controlling from the control device 7.

The XY scanner 52 moves the probe 2a and sample S relative to each other in an XY direction through a control from the control device 7. In FIG. 1, a plane parallel with a surface of the sample stage 4 is a horizontal surface, and here, is defined as an XY plane by orthogonal two axes X and Y. For elevation stage, the XY scanner 52 is a piezo-electric element.

A Z-direction driving device 51 and the XY scanner 52 may have any disposition relationship as long as a configuration thereof is capable of relative scanning for observing a three-dimensional shape.

The displacement detecting unit 6 detects a deflection amount and a twist amount of the cantilever 2. In the first embodiment, a case where the displacement detecting unit 6 detects the deflection amount and the twist amount of the cantilever 2 using an optical lever type will be described.

The displacement detecting unit 6 includes an irradiation unit 61 and a light detection unit 62.

The optical irradiation unit 61 irradiates a reflection surface (not illustrated) formed on a back surface of the cantilever 2 with laser light L1.

The light detection unit 62 receives the laser light L2 reflected by the reflection surface. The light detection unit 62 is a photodetector including a four-divided light receiving surface 27 that receives the laser light L2 reflected by the back surface. That is, an optical path is adjusted (in general, to be in the vicinity of the center of the light receiving surface 27) such that the laser light L2 reflected by the back surface of the cantilever 2 is incident to a plurality of light receiving surfaces 27, that is divided into four sections, of the light detection unit 62.

Figure 2:
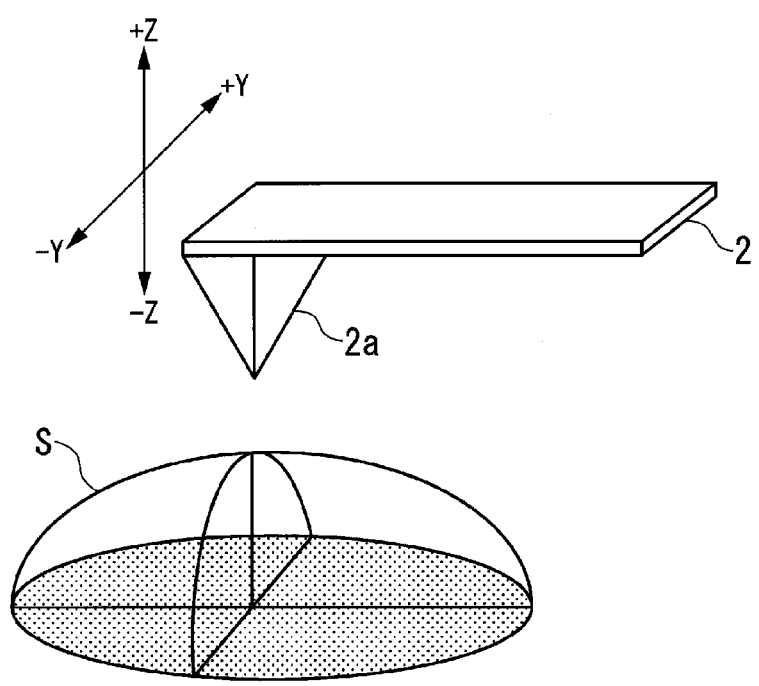
FIG. 2 is a perspective diagram showing a sample S having a slope and a cantilever 2 according to the first embodiment.

Hereinafter, a method of detecting the deflection amount and the twist amount of the cantilever 2 according to the first embodiment will be described with reference to FIGS. 1 and 2. FIG. 2 is a perspective diagram showing a sample S having a slope and the cantilever 2.

In a case where the probe 2a and sample surface contact with each other, a displacement occurs on the cantilever 2 in either or both of the Z direction and a Y direction. In the first embodiment, a displacement of the cantilever 2 occurring in the Z direction is referred to as a deflection amount and a displacement of the cantilever 2 occurring in the Y direction is referred to as a twist amount. For example, in an initial state, an incidence spot position of the laser light L2 reflected in a state where a force is not applied to the probe 2a, in the light receiving surface 27 of the light detection unit 62, is assumed as the center position of the light receiving surface 27. The state where a force is not applied to the probe 2a is, for example, is a state of a not-deformed cantilever (hereinafter, referred to as "free state") in which the probe 2a and the sample surface do not contact with each other.

In a contact mode, when the probe 2a and sample surface contact with each other, a force is applied to the probe 2a. Therefore, the deflection amount and the twist amount is generated in the cantilever 2. Accordingly, a reflection spot position of the laser light L2 reflected by the back surface of the cantilever 2 where the deflection amount or the twist amount is generated is displaced from the center position. Therefore, the scanning probe microscope A becomes possible to detect a magnitude and a direction of the force applied to the probe 2a by catching a movement direction of the spot position in the light receiving surface 27 of the light detection unit 62.

For example, in FIG. 1, in a case where the twist amount is generated in the cantilever 2, it is possible to catch a change in the spot position in an α direction in the light receiving surface 27 of the light detection unit 62. In addition, in a case where the deflection amount is generated in the cantilever 2, it is possible to catch a change in the spot position in a β direction in the light receiving surface 27.

Here, a change amount of the spot position from the center position depends on the twist amount or the deflection amount. Specifically, in a case where the cantilever 2 is deflected in a +Z direction, the reflection spot of the laser light L2 in the light receiving surface 27 of the light detection unit 62 changes in a +β direction. In addition, in a case where the cantilever 2 is deflected in a −Z direction, the reflection spot of the laser light L2 in the light receiving surface 27 of the light detection unit 62 changes in a −β direction. On the other hand, in a case where the twist amount in a +Y direction is generated in the cantilever 2, the reflection spot position of the laser light L2 in the light receiving surface 27 of the light detection unit 62 changes in a +α direction. In addition, in a case where the twist amount in a −Y direction is generated in the cantilever 2, the reflection spot of the laser light L2 in the light receiving surface 27 of the light detection unit 62 changes in a −α direction.

The light detection unit 62 outputs a first detection signal according to the reflection spot position of the laser light L2 in ±Z directions of the light receiving surface 27 to the control device 7. That is, the first detection signal is a DIF signal (the deflection signal) according to the deflection amount of the cantilever 2. In addition, the light detection unit 62 outputs a second detection signal according to the reflection spot position of the laser light L2 in ±Y directions of the light receiving surface 27 to the control device 7. That is, the second detection signal is an FFM signal (the twist signal) according to the twist amount of the cantilever 2.

Next, the control device 7 according to the first embodiment will be described.

As shown in FIG. 1, the control device 7 includes a determination unit 42, a driving control unit 43, and a measurement unit 44.

The determination unit 42 determines whether the probe 2a has contacted with the sample surface based on the first detection signal and the second detection signal which are output from the light detection unit 62. In the following description, a process of determining whether the probe 2a has contacted with the sample surface is referred to as a "contact determination process."

In addition, the determination unit 42 determines whether the probe 2a is separated from the sample surface based on the first detection signal and the second detection signal which are output from the light detection unit 62. In the following description, a process of determining whether the probe 2a is separated from the sample surface is referred to as a "separation determination process."

The driving control unit 43 controls an amount of relative movement between the probe 2a and sample S by the movement driving unit 5. Here, the scanning probe microscope A according to the first embodiment of the present disclosure uses an intermittent measurement method by which the sample surface is intermittently scanned by causing the probe 2a to contact with the sample surface only in a plurality of preset measuring points. Accordingly, the driving control unit 43 controls the respective operations of the approaching operation by which the probe 2a approaches the measuring position, the separating operation by which the probe 2a and the sample S are separated from each other, and a moving operation by which the probe 2a is moved to the position above the next measuring position.

Specifically, the driving control unit 43 outputs a contact operation signal for causing the probe 2a and sample surface to contact with each other to the Z-direction driving device 51 and raises the sample S. Accordingly, the driving control unit 43 causes the probe 2a and sample surface to contact with each other.

In a case where it is determined that the probe 2a has contacted with the sample surface in the contact determination process, the driving control unit 43 stops the approaching operation of raising the sample S by stopping the output of the contact operation signal to the Z-direction driving device 51.

The driving control unit 43 outputs the separating operation signal for separating the sample surface from the probe 2a, to the Z-direction driving device 51, and lowers the sample S. Accordingly, the driving control unit 43 causes the sample surface to be moved in a direction being separated from the probe 2a. That is, the driving control unit 43 causes the sample surface to be retracted from a state of contacting with the probe 2a.

Here, one of the features of the first embodiment is that, in the separating operation, the driving control unit 43 moves the sample S in the direction of being separated from the probe 2a at a speed exceeding a response speed of the cantilever 2. The response speed is an average movement speed that is calculated based on a resonant frequency of the cantilever 2 and amplitude with which a stable operation is possible at the resonant frequency. Thus, the separating operation according to the first embodiment is an operation in which the sample S is operated in the direction of being separated from the probe 2a at the speed exceeding the response speed of the cantilever 2.

In a case where it is determined that the probe 2a is separated from the sample surface in the separation determination process, the driving control unit 43 stops the separating operation of lowering the sample S by stopping the output of the separating operation signal to the Z-direction driving device 51.

The driving control unit 43 moves the probe 2a to a before-lowering measurement position that is located immediately above the next measurement position by outputting a driving signal to the XY scanner 52.

The measurement unit 44 measures an uneven shape of the sample surface in a state where the probe 2a and the sample surface contact with each other. For elevation stage, in a case where it is determined that the probe 2a has contacted with the sample surface in the contact determination process, the measurement unit 44 measures the uneven shape of the sample surface by measuring a distance of relative movement of the sample surface with respect to the probe 2a in the approaching operation (hereinafter, simply referred to as "relative distance"). For example, the measurement unit 44 may calculate the relative distance based on a voltage value of the driving signal in a state where the probe 2a and the sample surface contact with each other. In addition, the measurement unit 44 may directly measure the displacement of the sample stage 4 using a sensor (not illustrated) and may also directly measure a height of the sample stage 4 using a sensor (not illustrated).

Figure 3:
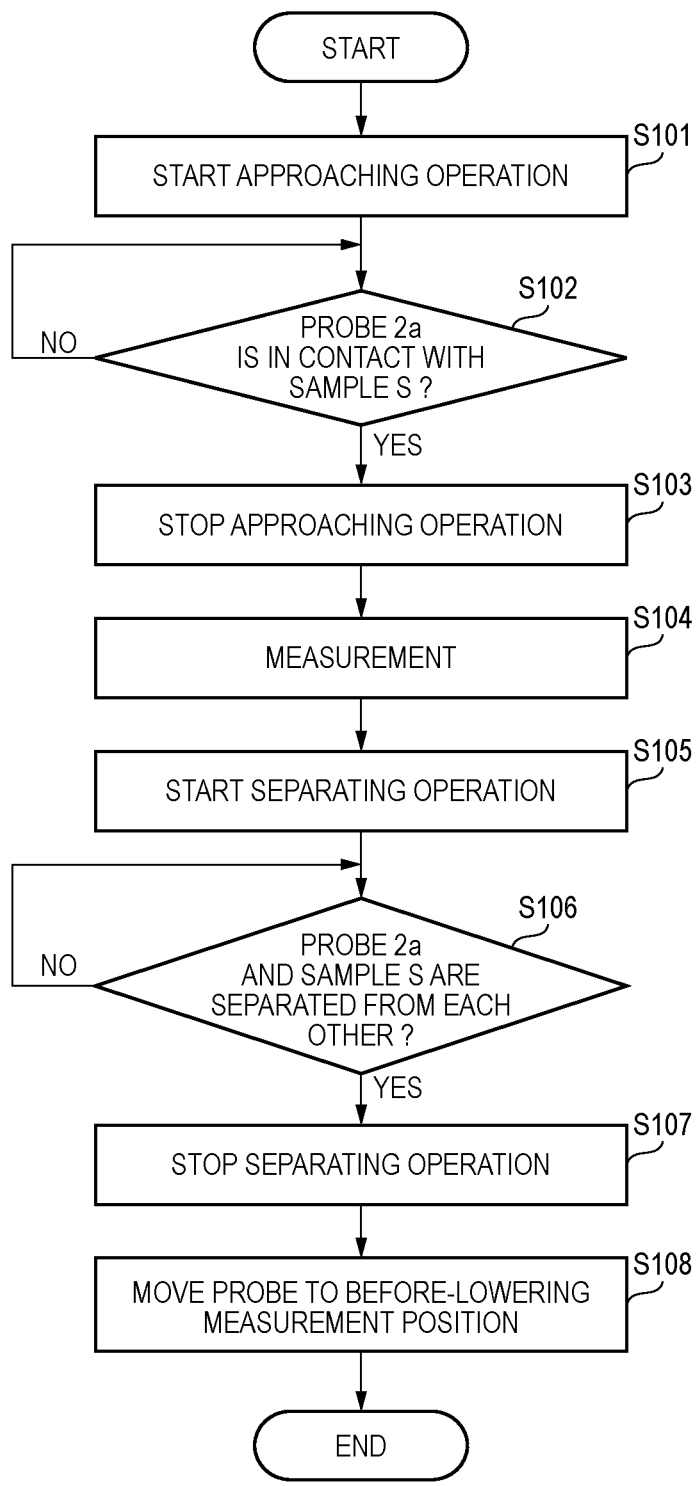
FIG. 3 is a diagram showing a flow of an intermittent measurement method of the scanning probe microscope A according to the first embodiment.

Next, a flow of the intermittent measurement method of the scanning probe microscope A according to the first embodiment will be described with reference to FIG. 3. As an initial state, a case where the probe 2a is located in the before-lowering measurement position at a predetermined measuring point is assumed.

The driving control unit 43 starts the approaching operation of causing the probe 2a to approach the sample surface by outputting the contact operation signal to the Z-direction driving device 51 and raising the sample stage 4 (Step S101).

In a case where the approaching operation is started, the determination unit 42 executes the contact determination process of determining whether the probe 2a has contacted with the sample surface, based on the first detection signal and the second detection signal which are output from the light detection unit 62 (Step S102).

In a case where it is determined that the probe 2a has contacted with the sample surface in the contact determination process, the determination unit 42 stops the approaching operation (Step S103). In this case, since the probe 2a is in contact with the sample surface, a certain amount of twist or deflection occurs in the cantilever.

In a case where it is determined that the probe 2a and the sample surface have contacted with each other, the measurement unit 44 measures the uneven shape of the sample surface by measuring the relative distance (Step S104).

In a case where the measurement unit 44 has completed the measurement of the relative distance, the driving control unit 43 starts the separating operation in which the sample S is moved in the direction of being separated from the probe 2a at the speed exceeding the response speed of the cantilever 2 (Step S105).

In a case where the separating operation is started, the determination unit 42 executes the separation determination process of determining whether the probe 2a is separated from the sample surface, based on the first detection signal and the second detection signal which are output from the light detection unit 62 (Step S106).

In a case where it is determined that the probe 2a is separated from the sample surface in the separation determination process, the driving control unit 43 stops the separating operation (Step S107). The driving control unit 43 outputs the driving signal to the XY scanner 52, thereby moving the probe 2a to the before-lowering measurement position that is located immediately above the next measurement position (Step S108). The driving control unit 43 lowers the cantilever 2 from the before-lowering measurement position and brings the probe 2a into contact with the sample surface in the next measurement position, then, the measurement unit 44 starts the measurement of the relative distance again. In this manner, the scanning probe microscope A performs operations from Steps S101 to S108 corresponding to respective measuring points of the sample surface to scan the sample surface intermittently.

Hereinafter, the contact determination process according to the first embodiment will be described.

In a case where the deflection amount indicated by the first detection signal output from the light detection unit 62 exceeds a first range, the determination unit 42 determines that the probe 2a has contacted with the sample surface.

In a case where the twist amount indicated by the second detection signal output from the light detection unit 62 exceeds a second range, the determination unit 42 determines that the probe 2a has contacted with the sample surface.

In this manner, in a case where at least one of a first condition in which the deflection amount, that the first detection signal output from the light detection unit 62 shows, exceeds the first range and a second condition in which the twist amount, that the second detection signal output from the light detection unit 62 shows, exceeds the second range, is established, the determination unit 42 determines that the probe 2a has contacted with the sample surface. In the above, although a case where the first detection signal and the second detection signal are independently determined is exemplified, a determination may be performed based on a set value corresponding to the characteristics, for example, in the determination unit 42, it may be determined to a contact state in a case where a "square of the first detection signal" and a "square of the second detection signal" are added together and a positive number of the square root of the sum is equal to or greater than a certain value.

Figure 4:
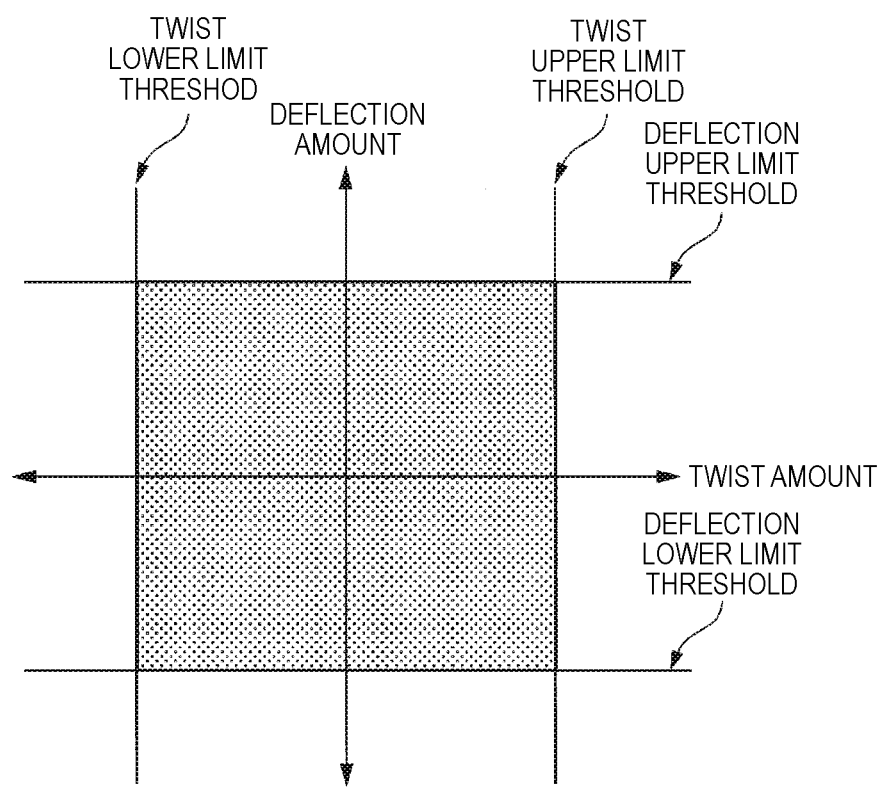
FIG. 4 is a diagram illustrating a first range and a second range according to the first embodiment.

Hereinafter, the first range and the second range in the present embodiment will be described with reference to FIG. 4. As shown in FIG. 4, the first range is a range between a deflection upper limit threshold and a deflection lower limit threshold. The deflection upper limit is the deflection amount of the cantilever 2 that is deflected in the +Z direction by contact between surfaces of the probe 2a and the sample S. Meanwhile, the deflection lower limit is the deflection amount of the cantilever 2 that is deflected in the −Z direction by contact between surfaces of the probe 2a and the sample S. Accordingly, in a case where the deflection amount, that the first detection signal output from the light detection unit 62 shows, exceeds the deflection upper limit or in a case where the deflection amount, that the first detection signal shows, falls below the deflection lower limit, the determination unit 42 determines that the probe 2a has contacted with the sample surface.

The second range is a range between a twist upper limit threshold and a twist lower limit threshold. The twist upper limit is the twist amount of the cantilever 2 that is twisted in the +Y direction by contact between surfaces of the probe 2a and the sample S. Meanwhile, the twist lower limit is the twist amount of the cantilever 2 that is twisted in the −Y direction by contact between the probe 2a and the sample surface. Accordingly, in a case where the twist amount, that the second detection signal output from the light detection unit 62 shows, exceeds the twist upper limit or in a case where the twist amount, that the second detection signal shows, falls below the twist lower limit, the determination unit 42 determines that the probe 2a has contacted with the sample surface. In this manner, in a case where a position, that the deflection amount shown by the first detection signal and the twist amount shown by the second detection signal show, is positioned outside a shaded area in a two-dimensional coordinate of the deflection amount and the twist amount shown in FIG. 4, it is determined that the probe 2a has contacted with the sample surface.

Next, the separation determination process according to the first embodiment will be described.

In a case where a vibration of the cantilever 2 with predetermined amplitude is detected at the resonant frequency of the cantilever in the separating operation, the discharge passage 42 determines that the probe 2a is separated from the sample surface. The predetermined amplitude is a range smaller than the displacement of the cantilever 2 in a state where the probe 2a is in contact with the sample surface, with reference to an amplitude of the cantilever 2 due to thermal vibration in the free state.

For example, the separation determination process is a process of determining whether a rate of change in the amplitude in the deflection direction in the vicinity of the resonant frequency of the cantilever 2 is equal to or greater than a predetermined value, in a case where the sample S is operated in the separating direction from the probe 2a at the speed exceeding the response speed of the cantilever 2. Here, the case where the rate of change in the amplitude in the deflection direction represents a case where the amplitude in the deflection direction rapidly increases. The separation determination process may be a process of determining whether the frequency of the vibration of the cantilever 2 with predetermined amplitude is the resonant frequency of the cantilever, in a case where the sample S is operated in the separating direction from the probe 2a at the speed exceeding the response speed of the cantilever 2.

In a case where the sample S is operated in the separating direction from the probe 2a at the speed exceeding the response speed of the cantilever 2, when it is determined that a vibration frequency of the cantilever 2 is the resonant frequency of the cantilever and the rate of change in the amplitude of the cantilever 2 is equal to or greater than the predetermined value, the determination unit 42 determines that the probe 2a is separated from the sample surface. On the other hand, in a case where the sample S is operated in the separating direction from the probe 2a at the speed exceeding the response speed of the cantilever 2, when it is determined that the vibration frequency of the cantilever 2 is not the resonant frequency of the cantilever or the rate of change in the amplitude of the cantilever 2 is less than the predetermined value, the determination unit 42 determines that the probe 2a and the sample surface contact with each other (are not separated from each other).

Hereinafter, an operation effect of the separation determination process according to the first embodiment will be described with reference to FIGS. 5A, 5B, 6A, and 6B.

Figure 5:
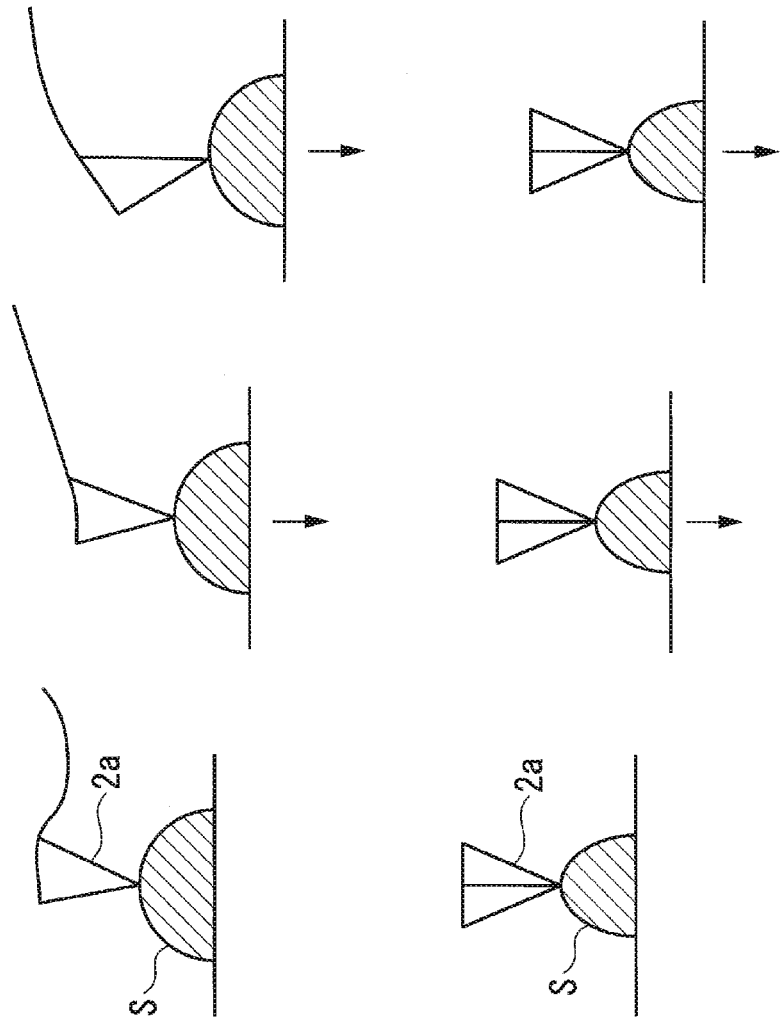
FIGS. 5A and 5B are diagrams showing a state of the cantilever 2 in a case where the sample S is moved in a direction being separated from the probe 2a at a normal speed.
Figure 6:
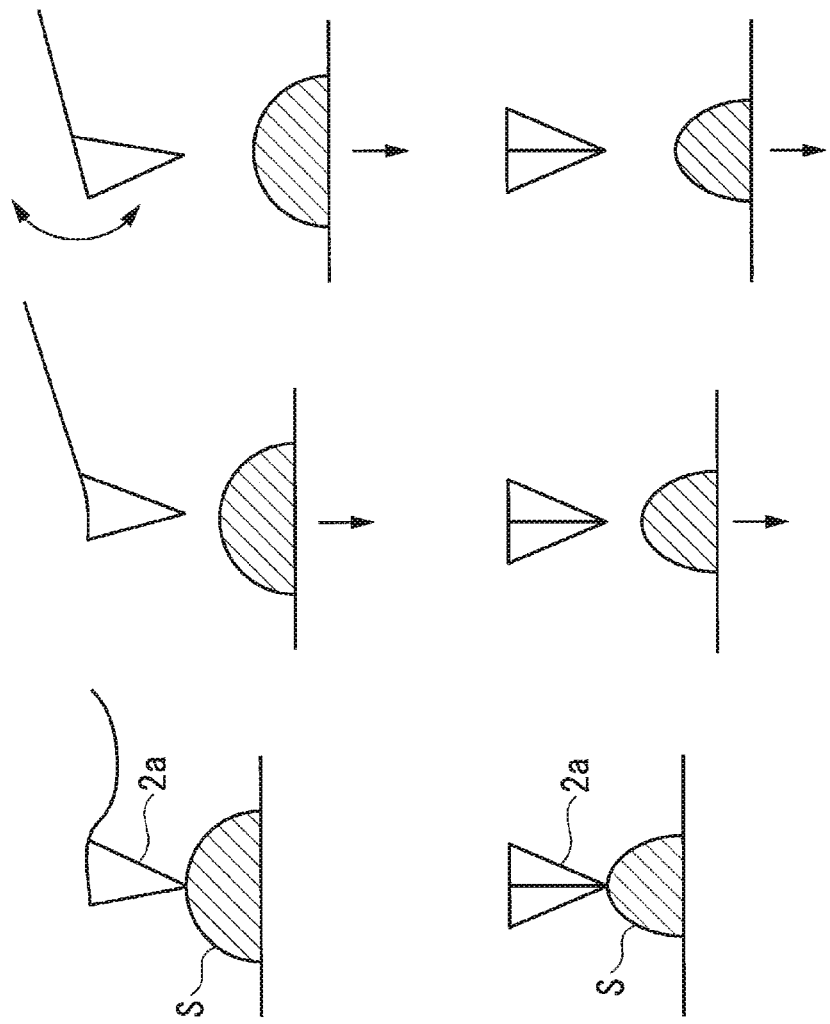
FIGS. 6A and 6B are diagrams showing a state of the cantilever 2 in a separating operation (in a case where the sample S is moved in the direction being separated from the probe 2a at a speed exceeding a response speed of the cantilever 2) according to the first embodiment.

FIGS. 5A and 5B are diagrams showing a state of the cantilever 2 in a case where the sample S is moved in a direction being separated from the probe 2a at a normal speed. FIGS. 6A and 6B are diagrams showing a state of the cantilever 2 in a separating operation (in a case where the sample S is operated in the direction being separated from the probe 2a at a speed exceeding a response speed of the cantilever 2) according to the first embodiment. FIGS. 5A and 6A show side views of the cantilever 2 as viewed from the −Y direction, and FIGS. 5B and 6B show side views of the cantilever 2 as viewed from −X direction.

In a case where at least one of the deflection amount and the twist amount of the cantilever 2 is out of a predetermined range in the above described contact determination process, the determination unit 42 determines that the probe 2a has contacted with the sample surface. Accordingly, in contraposition with above, if the deflection amount and the twist amount of the cantilever 2 are within the predetermined ranges, the probe 2a is not in contact with the sample surface, that is, it represents that the probe 2a and the sample surface are separated from each other.

However, there may be adsorption power between the probe 2a and the sample surface in some cases. Therefore, as shown in FIGS. 5A and 5B, in a case where the sample S is separated from the probe 2a at a normal speed, even in a case where the deflection amount and the twist amount of the cantilever 2 are within the predetermined range, the probe 2a and the sample surface may be in contact with each other by the adsorption power. In addition, the adsorption power between the probe 2a and the sample surface may be different at each measuring point. Accordingly, it is not possible to uniquely set the respective thresholds of the deflection amount and the twist amount when the probe 2a and the sample surface are separated from each other.

On the other hand, as shown in FIGS. 6A and 6B, in the first embodiment, the driving control unit 43 separates the sample S from the probe 2a at the speed exceeding the response speed of the cantilever 2. Here, the probe 2a cannot move faster than the response speed of the cantilever 2. Accordingly, when the sample S is separated from the probe 2a at the speed exceeding the response speed of the cantilever 2, even in a case where there is the adsorption power between the probe 2a and the sample surface, the probe 2a is immediately separated from a state of contacting with the sample surface.

Accordingly, the cantilever 2 resonates with the amplitude from a state in which the probe 2a and the sample surface contact with each other, that is, a state in which the probe 2a is pushed upward, to the free state. In other words, the amplitude in the deflection direction at the resonant frequency of the cantilever 2 rapidly increases. Therefore, in a case where the vibration of the cantilever 2 with the amplitude in the deflection direction is detected at the resonant frequency (including high-order frequency) of the cantilever 2 during the separating operation, the determination unit 42 according to the first embodiment determines that the probe 2a is separated from the sample surface. Accordingly, even in a case where there is the adsorption power between the probe 2a and the sample surface, it is possible to certainly detect that the probe 2a is separated from the sample surface.

In a case where the separation is performed at the speed exceeding the response speed of the cantilever 2, when there is no adsorption power between the probe 2a and the sample surface, the vibration starting from the deflected state of the cantilever 2 occurs at the resonant frequency in the deflection direction.

Hereinafter, a flow of the separation determination process according to the first embodiment will be described with reference to FIG. 7.

The determination unit 42 determines whether the deflection amount indicated by the first detection signal output from the light detection unit 62 is within the first range (Step S201). In a case where the it is determined that the deflection amount, that the first detection signal output from the light detection unit 62 shows, is within the first range, the determination unit 42 determines whether the twist amount, that the second detection signal output from the light detection unit 62 shows, is within the second range (Step S202). On the other hand, in a case where the deflection amount, that the first detection signal output from the light detection unit 62 shows, is out of the first range, the determination unit 42 determines that the probe 2a is not separated from the sample surface (Step S206).

In a case where it is determined that the twist amount, that the second detection signal output from the light detection unit 62 shows, is within the second range, the determination unit 42 determines whether the frequency of the first detection signal is the resonant frequency of the cantilever 2 (Step S203). On the other hand, in a case where it is determined that the twist amount, that the second detection signal output from the light detection unit 62 shows, is out of the second range, the determination unit 42 determines that the probe 2a is not separated from the sample surface (Step S206).

In a case where it is determined that the frequency of the first detection signal is the resonant frequency of the cantilever 2, the determination unit 42 determines whether the rate of change in the deflection amount, that the first signal shows, exceeds a predetermined value (Step S204). Meanwhile, in a case where it is determined that the frequency of the first detection signal is not the resonant frequency of the cantilever 2, the determination unit 42 determines that the probe 2a is not separated from the sample surface (Step S206).

In a case where the change in deflection amount, that the first detection signal shows, exceeds a predetermined value, the determination unit 42 determines that the probe 2a is separated from the sample surface (Step S205). Meanwhile, in a case where the change in deflection amount, that the first detection signal shows, exceeds a predetermined value, the determination unit 42 determines that the probe 2a is not separated from the sample surface (Step S206).

Figure 7:
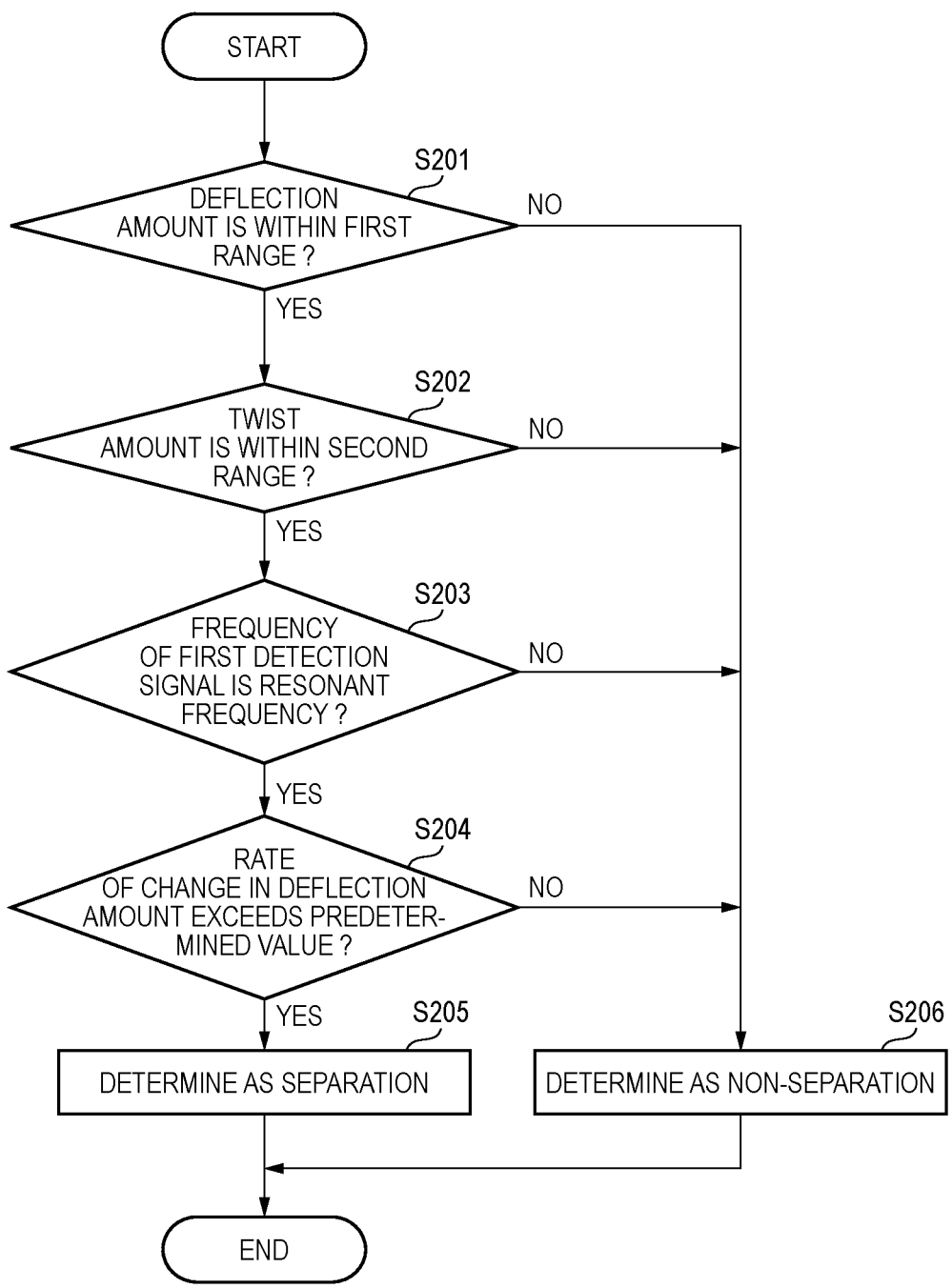
FIG. 7 is a flowchart of a separation determination process according to the first embodiment.

In FIG. 7, the process of Step S202 is executed after the process of Step S201; however, it is not limited thereto. The determination unit 42 of the present embodiment may perform the process of Step S201 after the process of Step S202 and may execute the process of Step S201 and the process of S202 in parallel. In the same manner, the determination unit 42 may execute the process of Step S204 after the process of Step S203, and may execute the process of Step S203 and the process of S204 in parallel.

As described above, in a case where the vibration of the cantilever 2 at the predetermined amplitude is detected at the resonant frequency (including high-order frequency) of the cantilever 2 during the separating operation in which the sample S is separated from the probe 2a at the speed exceeding the response speed of the cantilever 2, the scanning probe microscope A according to the first embodiment determines that the probe 2a is separated from the sample surface. The scanning probe microscope A stops the separating operation by the Z-direction driving device 51 at a moment of time when it is determined that the probe 2a is separated from the sample surface and relatively moves the probe 2a and the sample to a position where the probe 2a is located immediately above the next measuring point of the sample S.

Accordingly, since the scanning probe microscope A is operated at an optimal separation distance at the respective measuring points of the sample S, it is possible to achieve the measurement of the uneven shape in the sample surface in the shortest time. Therefore, the scanning probe microscope A is possible to improve the efficiency of measuring the uneven shape in the sample surface.

Here, the first detection signal showing the deflection amount may drift due to a temperature change or the like in some cases. In the related art, it is necessary to determine the separation distance in consideration of the influence of this drift, and an optimization cannot be performed in advance in some cases.

On the other hand, even in a case where the first detection signal has drifted, the scanning probe microscope A according to the first embodiment successively determines whether the probe 2a is separated from the sample surface. According to this, the scanning probe microscope A is not affected by the drift and can be operated at the optimal separation distance.

Figure 8:
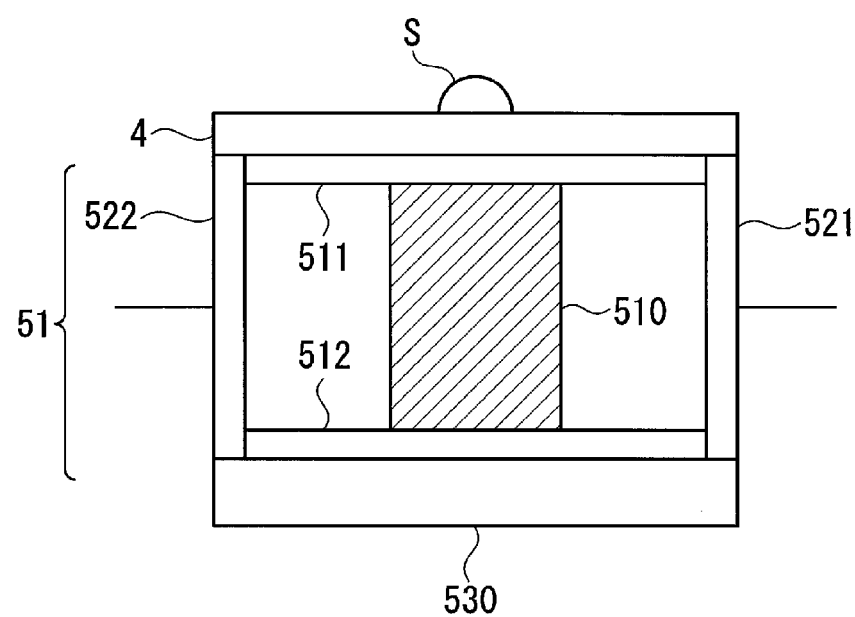
FIG. 8 is a diagram showing an example of a schematic configuration of a Z-direction driving device 51 according to the first embodiment.

In the above described embodiment, the Z-direction driving device 51 is necessary to perform the separating operation in which the sample S is moved in the direction being separated from the probe 2a at a speed at which the vibration does not occur. According to this, the Z-direction driving device 51 may have a configuration using a laminated piezoelectric element 510. For example, as shown in FIG. 8, the Z-direction driving device 51 includes the laminated piezoelectric element 510, flat springs 511 and 512 that have the same spring constant, support-plates 521 and 522 that respectively fix the flat springs 511 and 512, and a base 530.

In one end of the laminated piezoelectric element 510, the sample stage 4 and the sample S are provided via the flat spring 511. In addition, in the other end of the laminated piezoelectric element 510, the base 530 is provided via the flat spring 512. The weight of the base 530 corresponds to the weight of the sample stage 4 and sample S.

In a case where the Z-direction driving device 51 is fixed, the Z-direction driving device 51 is fixed at the center of each of the support plates 521 and 522. Accordingly, the Z-direction driving device 51 can prevent the vibration from being transmitted to the surroundings even when performing the separating operation.

Second Embodiment

Hereinafter, a scanning probe microscope B according to a second embodiment will be described with reference to the drawings. The scanning probe microscope B according to the second embodiment performs a separation determination process based on the speed change of the cantilever 2 in the deflection direction, unlike the "separation determination process" according to the first embodiment. As a "contact determination process", the scanning probe microscope B according to the second embodiment performs the same process as the "contact determination process" according to the first embodiment.

Figure 9:
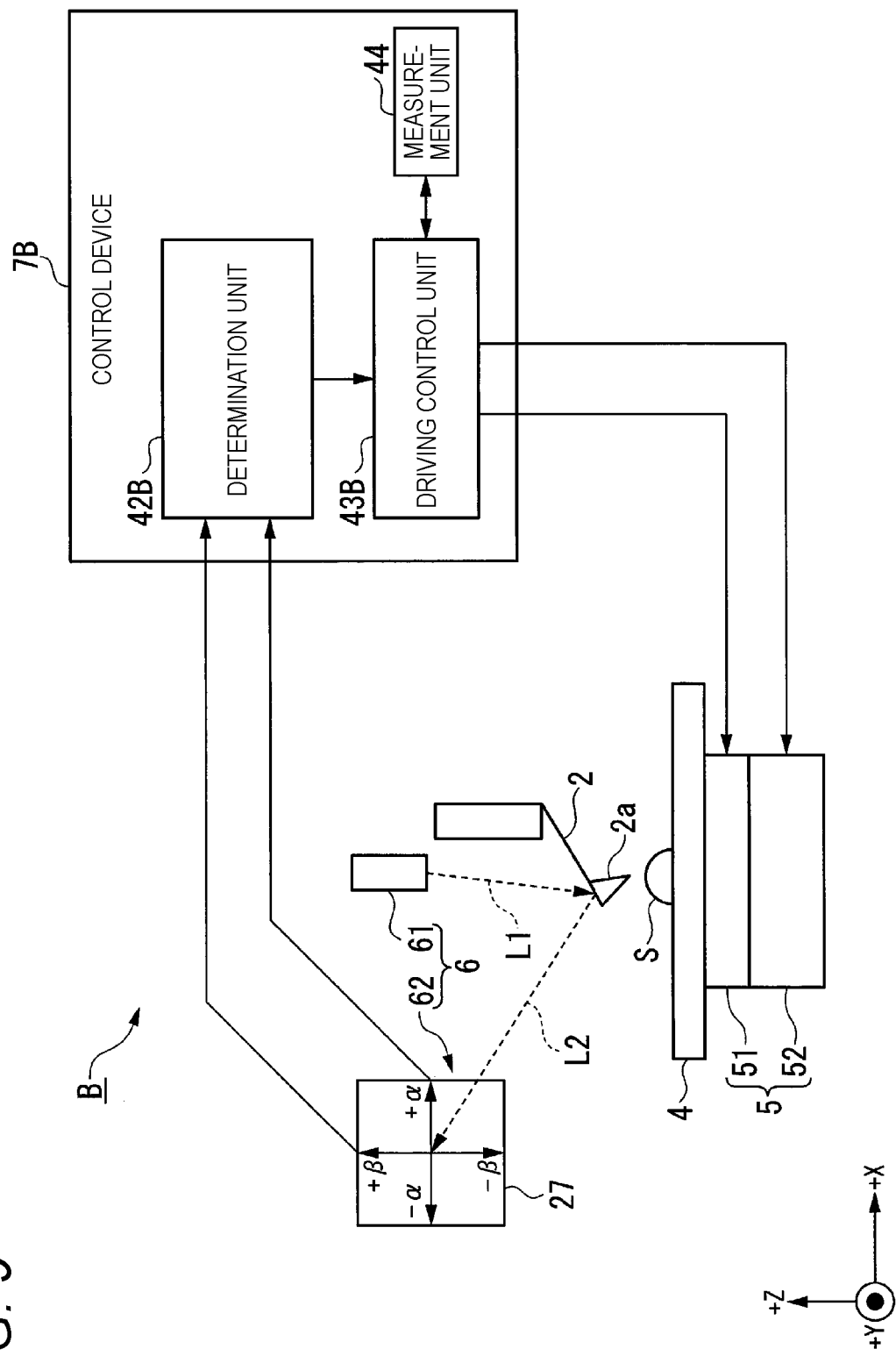
FIG. 9 is a diagram showing an example of a schematic configuration of a scanning probe microscope B according to a second embodiment.

FIG. 9 is a diagram showing an example of a schematic configuration of the scanning probe microscope B according to the second embodiment. As shown in FIG. 9, the scanning probe microscope B includes a cantilever 2, a sample stage 4, a movement driving unit 5, a displacement detecting unit 6, and a control device 7B.

The control device 7B includes a determination unit 42B, a driving control unit 43B, and a measurement unit 44.

The determination unit 42B performs the contact determination process of determining whether the probe 2a has contacted with the sample surface, based on the first detection signal and the second detection signal which are output from the light detection unit 62. The contact determination process of the determination unit 42B is the same as the contact determination process according to the first embodiment.

In addition, the determination unit 42B performs the separation determination process of determining whether the probe 2a is separated from the sample surface, based on the first detection signal and the second detection signal which are output from the light detection unit 62. Specifically, the separation determination process of the determination unit 42B is to determine the separation of the probe 2a with respect to the sample surface, based on the speed change of the cantilever 2 in the deflection direction during the separating operation.

The driving control unit 43B causes the sample S to be moved in the direction of being separated from the probe 2a at a speed equal to or lower than the response speed of the cantilever 2. That is, regarding the separating operation, in the first embodiment, the sample S is operated in the direction of being separated from the probe 2a at the speed exceeding the response speed of the cantilever 2, whereas in the second embodiment, the sample S is moved in the direction of being separated from the probe 2a at the speed equal to or lower than the response speed of the cantilever 2. The operations relating to the driving control unit 43B other than the separating operation are the same as those of the driving control unit 43.

Hereinafter, the separation determination process according to the second embodiment will be described.

The determination unit 42B determines the separation of the probe 2a with respect to the sample surface, based on the speed change of the cantilever 2 in the deflection direction during the separating operation in which the sample S is separated from the probe 2a at the speed equal to or lower than the response speed of the cantilever 2.

Here, the determination unit 42B can calculate the speed change of the cantilever 2 in the deflection direction from a ratio (Vd/H) between a deflection amount Vd of the cantilever 2 and a separated distance H of the sample S from the probe 2a. In addition, the determination unit 42B can calculate the speed change of the cantilever 2 in the deflection direction by differentiating the deflection amount Vd of the cantilever 2.

In a case where the speed of the cantilever 2 in the deflection direction is equal to or lower than a predetermined value during the separating operation in which the sample S is separated from the probe 2a at the speed equal to or lower than the response speed of the cantilever 2, the determination unit 42B determines that the probe 2a is separated from the sample surface.

In addition, in a case where a speed direction of the cantilever 2 is reversed during the separating operation in which the sample S is separated from the probe 2a at the speed equal to or lower than the response speed of the cantilever 2, the determination unit 42B determines that the probe 2a is separated from the sample surface.

Hereinafter, an operation effect of the separation determination process according to the second embodiment will be described with reference to the drawings.

Figure 10A:
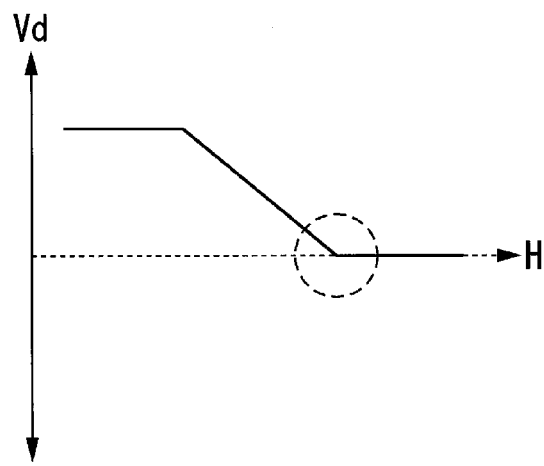
FIGS. 10A and 10B are graphs showing a speed change of the cantilever 2 in a deflection direction, in a separating operation according to the second embodiment.
Figure 10B:
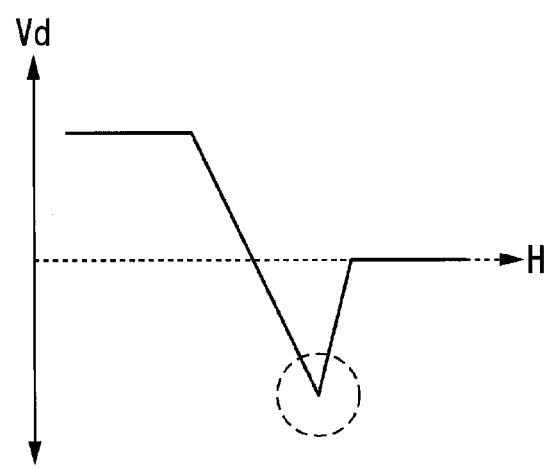
Figures 11A, 11B:
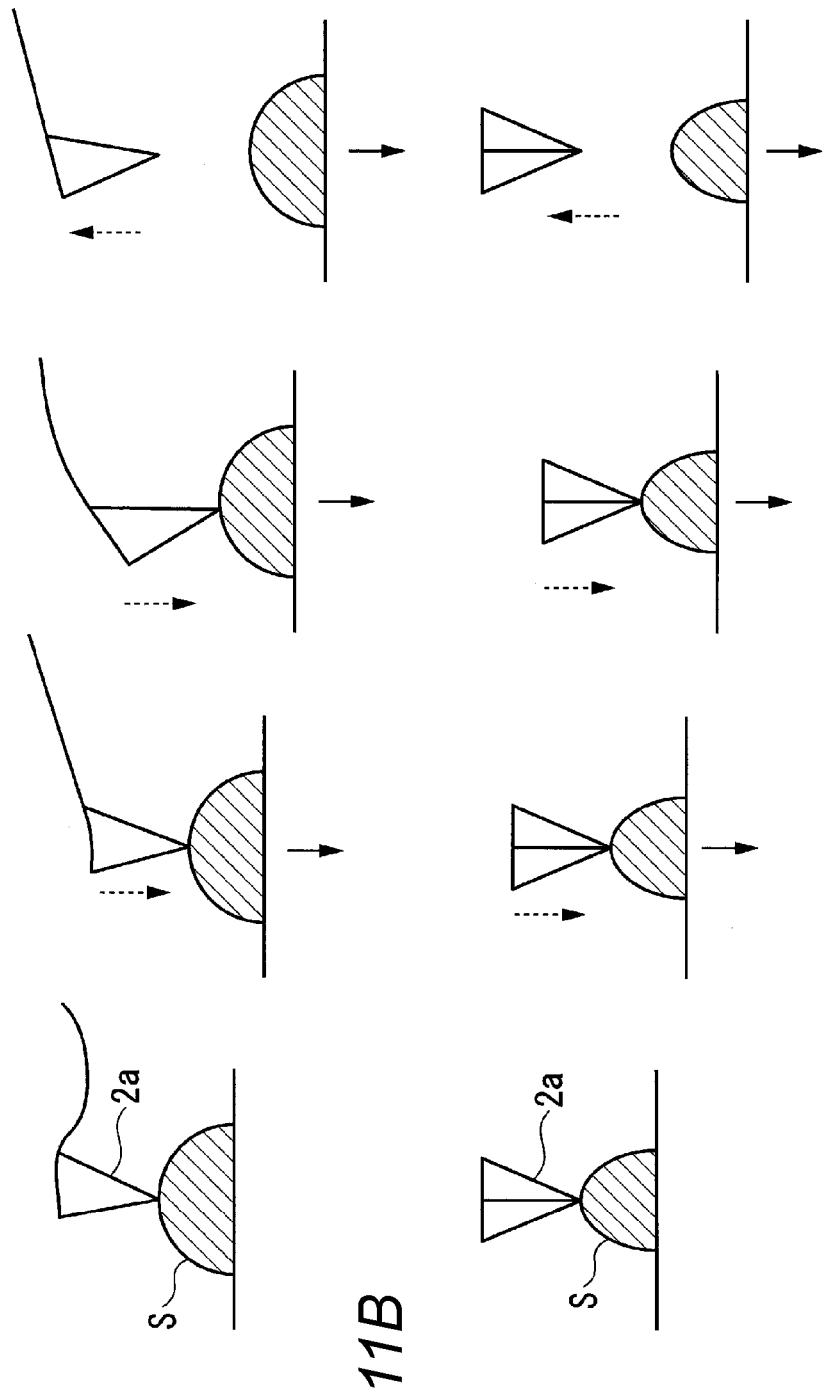
FIGS. 11A and 11B are diagrams showing a state of the cantilever 2 in the separating operation (in a case where the sample S is moved in the direction being separated from the probe 2a at a speed equal to or lower than the response speed of the cantilever 2) according to the second embodiment.

FIGS. 10A and 10B are graphs showing the speed change of the cantilever 2 in the deflection direction, in the separating operation according to the second embodiment. FIG. 10A is a graph of the speed change of the cantilever 2 in the deflection direction in a case where there is no adsorption power between the probe 2a and the sample S. FIG. 10B is a graph of the speed change of the cantilever 2 in the deflection direction in a case where there is the adsorption power between the probe 2a and the sample S. FIGS. 11A and 11B are diagrams showing a state of the cantilever 2 in the separating operation (in a case where the sample S is operated in the direction being separated from the probe 2a at a speed equal to or lower than the response speed of the cantilever 2) according to the second embodiment. FIG. 11A shows a side view of the cantilever 2 as viewed from the −Y direction, and FIG. 11B shows a side view of the cantilever 2 as viewed from −X direction.

In a case where the probe 2a and the sample surface are in contact with each other during the separating operation, a speed of the solution treatment in the deflection direction becomes a constant value.

Here, as shown in FIG. 10A, in a case where there is no adsorption power between the probe 2a and the sample S, when the probe 2a and the sample surface are separated from each other, the change in the deflection amount of the cantilever 2, that is, the speed of the cantilever 2 becomes appropriately zero in the free state. Therefore, in a case where the speed of the cantilever 2 in the deflection direction is equal to or lower than a predetermined value during the separating operation in which the sample S is separated from the probe 2a at the speed equal to or lower than the response speed of the cantilever 2, the determination unit 42B determines that the probe 2a is separated from the sample surface. Accordingly, in a case where there is no the adsorption power between the probe 2a and the sample S, the determination unit 42B can certainly detect the separation between the probe 2a and the sample S. In a case where the probe 2a and the sample surface are in contact with each other, the predetermined value is a value lower than the speed of the cantilever 2 in the deflection direction.

Meanwhile, as shown in FIGS. 10B, 11A, and 11B, in a case where there is the adsorption power between the probe 2a and the sample S, since the deflection parts due to the adsorption power returns when the probe 2a is separated from the sample surface, a sign of the value of Vd/H is reversed. That is, when the probe 2a and the sample surface are separated from each other, the speed direction of the cantilever 2 is reversed. Therefore, in a case where the speed direction of the cantilever 2 is reversed during the separating operation, the determination unit 42B determines that the probe 2a is separated from the sample surface. Accordingly, even in a case where there is the adsorption power between the probe 2a and the sample S, the determination unit 42B can certainly detect the separation between the probe 2a and the sample S.

Hereinafter, a flow of the separation determination process according to the second embodiment will be described with reference to FIG. 12.

The determination unit 42B determines whether the deflection amount indicated by the first detection signal output from the light detection unit 62 is within the first range (Step 301). In a case where the it is determined that the deflection amount, that the first detection signal output from the light detection unit 62 shows, is within the first range, the determination unit 42B determines whether the twist amount, that the second detection signal output from the light detection unit 62 shows, is within the second range (Step S302). On the other hand, in a case where the deflection amount, that the first detection signal output from the light detection unit 62 shows, is out of the first range, the determination unit 42B determines that the probe 2a is not separated from the sample surface (Step S306).

In a case where it is determined that the twist amount, that the second detection signal output from the light detection unit 62 shows, is within the second range, the determination unit 42B determines whether the speed of the cantilever 2 calculated based on the first detection signal is equal to or lower than a predetermined value (Step S303). On the other hand, in a case where it is determined that the twist amount, that the second detection signal output from the light detection unit 62 shows, is out of the second range, the determination unit 42B determines that the probe 2a is not separated from the sample surface (Step S306).

In a case where it is determined that the speed of the cantilever 2 is equal to or lower than a predetermined value, the determination unit 42B determines that the probe 2a is separated from the sample surface (Step S305). Meanwhile, in a case where it is determined that the speed of the cantilever 2 exceeds a predetermined value, the determination unit 42B determines whether the speed direction of the cantilever 2 is reversed (Step S304).

In a case where it is determined that the speed direction of the cantilever 2 is reversed, the determination unit 42B determines that the probe 2a is separated from the sample surface (Step S305). Meanwhile, in a case where it is determined that the speed direction of the cantilever 2 is not reversed, the determination unit 42B determines that the probe 2a is not separated from the sample surface (Step S306).

Figure 12:
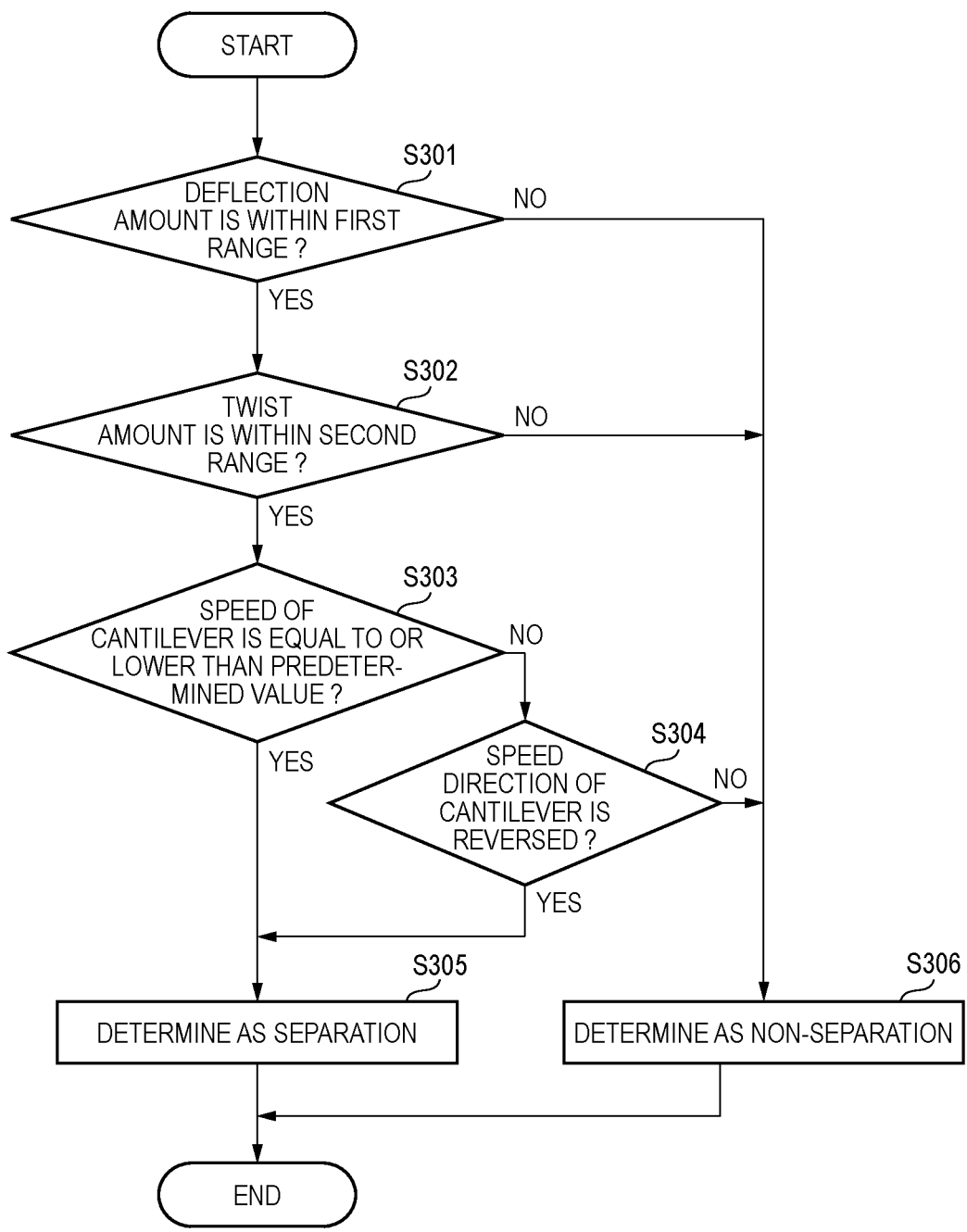
FIG. 12 is a flowchart of a separation determination process according to the second embodiment.

In FIG. 12, the process of Step S302 is executed after the process of Step S301; however, it is not limited thereto. The determination unit 42B of the present embodiment may perform the process of Step S301 after the process of Step S302 and may execute the process of Step S301 and the process of S302 in parallel. In the same manner, the determination unit 42B may execute the process of Step S304 after the process of Step S303, and may execute the process of Step S303 and the process of S304 in parallel.

As described above, the scanning probe microscope B according to the second embodiment determines the separation of the probe 2a with respect to the sample surface, based on the speed change of the cantilever 2 in the deflection direction during the separating operation in which the sample S is separated from the probe 2a at the speed not exceeding the response speed of the cantilever 2.

For example, in a case where the speed of the cantilever 2 in the deflection direction reaches a value equal to or lower than a predetermined value, the determination unit 42B determines that the probe 2a is separated from the sample surface. In addition, in a case where the probe 2a is reversed in the speed direction, the determination unit 42B determines that the probe 2a is separated from the sample surface.

Accordingly, since the scanning probe microscope B is operated at the optimal separation distance at the respective measuring points of the sample S even in a case where there is the adsorption power between the probe 2a and sample S, it is possible to achieve the measurement of the uneven shape in the sample surface in the shortest time. Therefore, the scanning probe microscope B is possible to improve the efficiency of measuring the uneven shape in the sample surface.

In the second embodiment, in the separating operation, the sample and the probe 2a are separated from each other by lowering the sample S; however, it is not limited thereto. The driving control unit 43B may separate the sample S and the probe 2a from each other by raising the probe 2a.

Third Embodiment

Hereinafter, a scanning probe microscope C according to a third embodiment will be described with reference to the drawings. The scanning probe microscope C according to the third embodiment performs a separation determination process based on an increase of the amplitude of the vibration in the cantilever 2 or a change of the vibration frequency of the vibration, unlike the "separation determination process" according to the first embodiment. As a "contact determination process", the scanning probe microscope C according to the third embodiment performs the same process as the "contact determination process" according to the first embodiment.

Figure 13:
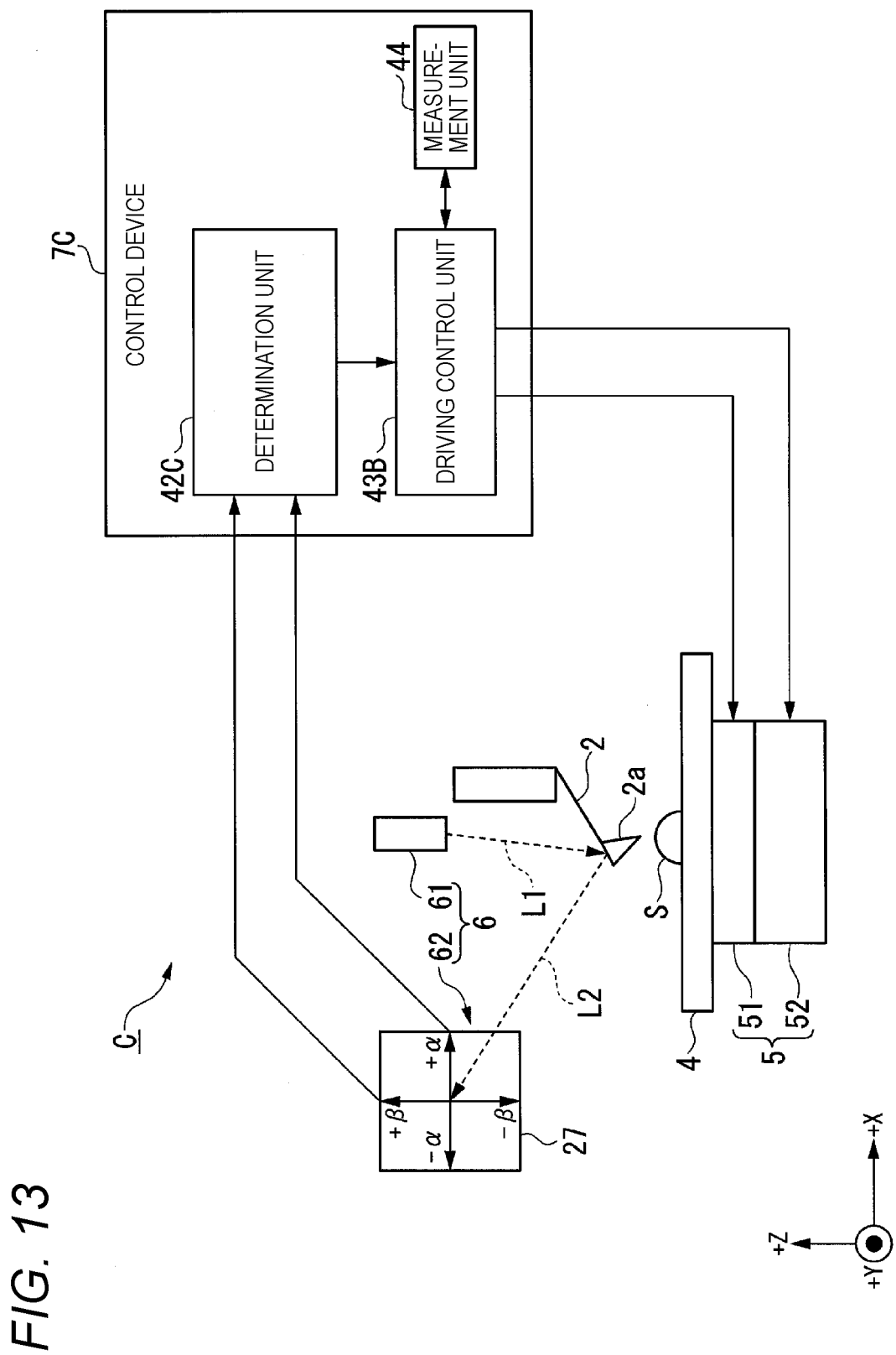
FIG. 13 is a diagram showing an example of a schematic configuration of a scanning probe microscope C according to a third embodiment.

FIG. 13 is a diagram showing an example of a schematic configuration of the scanning probe microscope C according to the third embodiment. As shown in FIG. 13, the scanning probe microscope C includes a cantilever 2, a sample stage 4, a movement driving unit 5, a displacement detecting unit 6, and a control device 7C.

The control device 7C includes a determination unit 42C, the driving control unit 43B, and a measurement unit 44.

The determination unit 42C performs the contact determination process of determining whether the probe 2a has contacted with the sample surface, based on the first detection signal and the second detection signal which are output from the light detection unit 62. The contact determination process of the determination unit 42C is the same as the contact determination process according to the first embodiment.

The determination unit 42C performs the separation determination process of determining whether the probe 2a is separated from the sample surface, based on the first detection signal and the second detection signal which are output from the light detection unit 62.

Figure 14A:
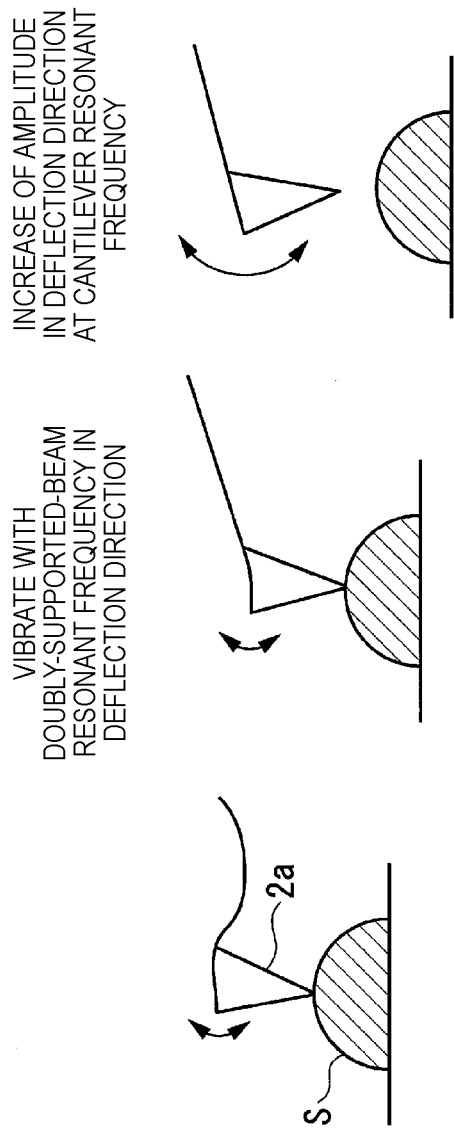
FIGS. 14A and 14B are diagrams showing a state of the cantilever 2 in a separating operation according to the third embodiment (FIG. 14A shows a case of vibrating the cantilever 2 in the deflection direction and FIG. 14B shows a case of vibrating the cantilever 2 in a twist direction)
Figure 14B:
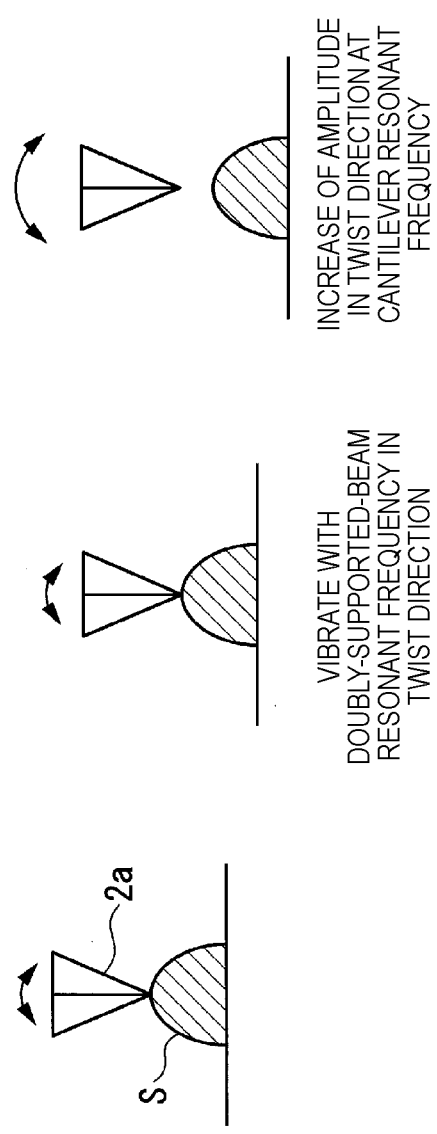

Hereinafter, a separation determination process according to the third embodiment will be described with reference FIGS. 14A and 14B.

For the separation determination process according to the third embodiment, there are roughly two methods of "a method of detecting a change of the amplitude of the deflection or the twist due to thermal vibration of the cantilever" and "detecting a change of the resonant frequency of the deflection or the twist due to thermal vibration of the cantilever."

<Method of Detecting Change in Amplitude of Deflection or Twist Due to Thermal Vibration or Cantilever>

In the cantilever 2, the base end is fixed and the tip (the probe 2a) is configured as a free end. Therefore, in a case where the probe 2a is not in contact with the sample surface, that is, is in a separated state, the cantilever 2 resonates with large amplitude due to a thermal vibration. In the following, a state of the cantilever 2 of which the base end is a fixed end and the tip (probe 2a) is the free end is referred to as a cantilever state.

On the other hand, in a case where the probe 2a is in contact with the sample surface, the probe 2a becomes to be fixed by the sample surface. That is, both the base end and the tip of the cantilever 2 become the fixed end. Therefore, the amplitude of the resonance due to the thermal vibration becomes smaller amplitude as compared to the cantilever state. Hereinafter, the state of the cantilever 2 of which both the base end and the tip are the fixed end is referred to as a doubly-supported state.

In a case of moving from a state where the probe 2a is in contact with the sample surface is shifted to a state where the probe 2a is separated from the sample surface, the amplitude of the vibration of the cantilever 2 becomes to increase. Then, the determination unit 42C determines the separation of the probe 2a with respect to the sample surface, based on the increase of the amplitude in the vibration of the cantilever 2. For example, in a case where the amplitude of the vibration in the cantilever 2 reaches a value equal to or larger than a predetermined value during the separating operation, the determination unit 42C determines that the probe 2a and the sample surface have been separated from each other. The amplitude of the vibration in the cantilever 2 is at least one of deflection amplitude and twist amplitude. In addition, the predetermined value is set based on the amplitude of the vibration of the cantilever 2 in the doubly-supported state.

<Detecting Change of Resonant Frequency of Deflection or Twist Due to Cantilever>

The resonant frequency of the cantilever 2 resonating due to the thermal vibration is different in the cantilever state and the doubly-supported state. Therefore, the state where the probe 2a is in contact with the sample surface is shifted to the state where the probe 2a is separated from the sample surface, the resonant frequency of the cantilever 2 changes. Hereinafter, the resonant frequency of the cantilever 2 in the cantilever state is referred to as a cantilever resonant frequency. Meanwhile, the resonant frequency of the cantilever 2 in the doubly-supported state is referred to as a doubly-supported-beam resonant frequency.

The determination unit 42C determines the separation of the probe 2a with respect to the sample surface, based on the change in the resonant frequency of the vibration in the cantilever 2 during the separating operation. For example, in a case where the change in the vibration frequency of the cantilever 2 during the separating operation reaches a value equal to or greater than a predetermined value, the determination unit 42C determines that the probe 2a and the sample surface have been separated from each other. The vibration in the cantilever 2 is a frequency of the vibration in at least one direction of the deflection direction and the twist direction. In addition, the predetermined value is set based on the doubly-supported-beam resonant frequency.

In any of the two separation determination processes described above, for determining the separation of the probe 2a with respect to the sample surface, it is a condition that the deflection amount, that the first signal output from the light detection unit 62 shows, is within the first range, and the twist amount, that the second signal output from the light detection unit 62 shows, is within the second range.

As described above, the scanning probe microscope C according to the third embodiment determines the separation of the probe 2a with respect to the sample surface, based on the increase of the vibration in the cantilever 2 or the change of the vibration frequency of the vibration during the separating operation. Accordingly, since the scanning probe microscope C is operated at the optimal separation distance at the respective measuring points of the sample S even in a case where there is the adsorption power between the probe 2a and sample S, it is possible to achieve the measurement of the uneven shape in the sample surface in the shortest time. Therefore, the scanning probe microscope C is possible to improve the efficiency of measuring the uneven shape in the sample surface.

In addition, since the scanning probe microscope C detects the separation between the probe 2a and the sample surface, there is no need to newly provide a structure.

Fourth Embodiment

Hereinafter, a scanning probe microscope D according to a fourth embodiment will be described with reference to the drawings. The scanning probe microscope D according to the fourth embodiment includes an oscillation unit 3 and performs a separation determination process based on a change in amplitude of a predetermined frequency in a deflection direction or a twist direction of the cantilever 2, unlike the "separation determination process" according to the first embodiment. As a "contact determination process", the scanning probe microscope D according to the fourth embodiment performs the same process as the "contact determination process" according to the first embodiment.

Figure 15:
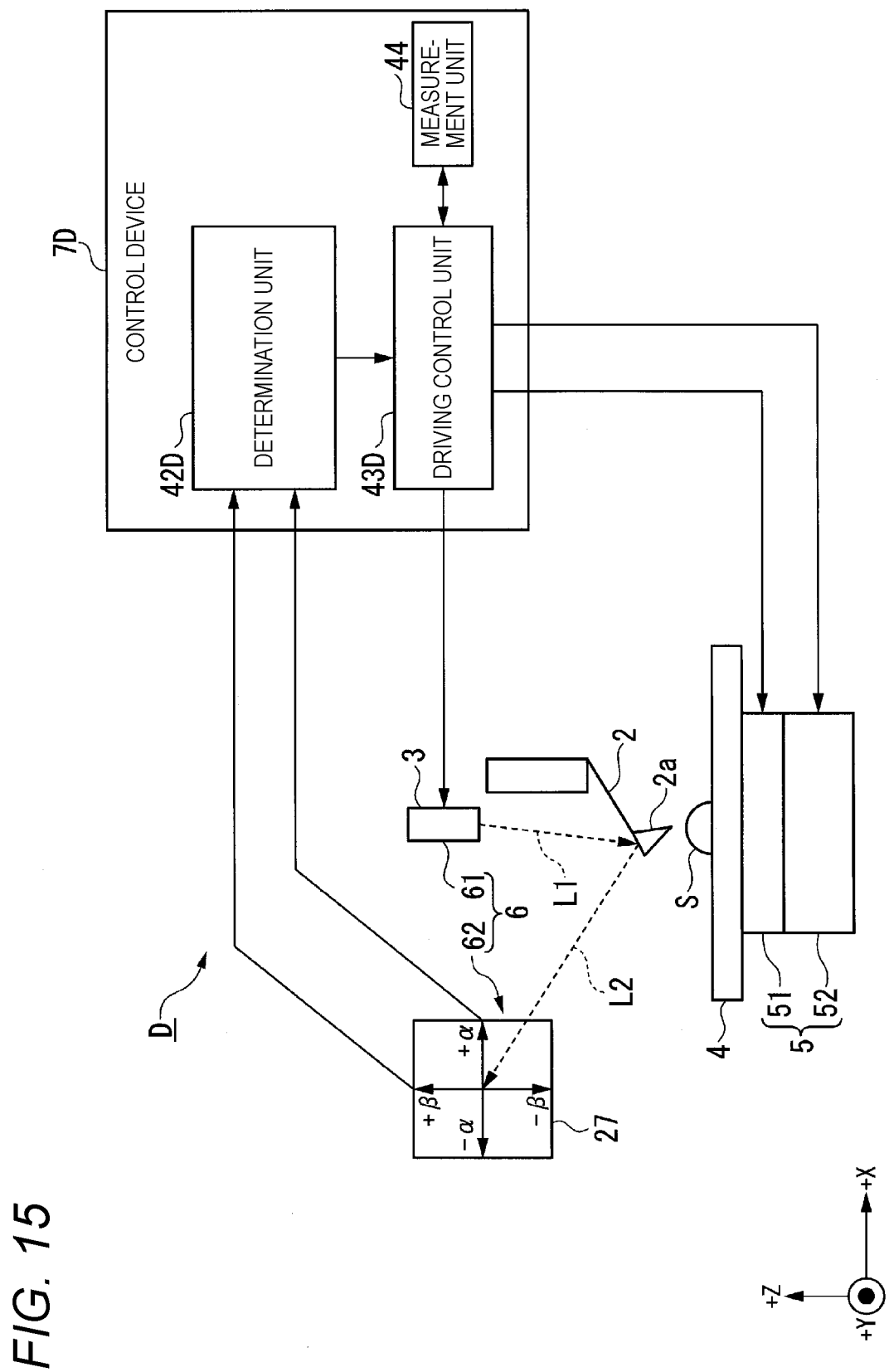
FIG. 15 is a diagram showing an example of a schematic configuration of a scanning probe microscope D according to a fourth embodiment.

FIG. 15 is a diagram showing an example of a schematic configuration of the scanning probe microscope D according to the fourth embodiment. As shown in FIG. 15, the scanning probe microscope D includes a cantilever 2, an oscillation unit 3, a sample stage 4, a movement driving unit 5, a displacement detecting unit 6, and a control device 7D.

The oscillation unit 3 relatively vibrates the sample S and the cantilever 2 at a predetermined frequency in a separating operation. For example, the oscillation unit 3 may excite the cantilever 2, or may excite the sample stage 4. In addition, a direction of the relative vibration between the sample S and the cantilever 2 at a predetermined frequency may be a direction (Z-direction) perpendicular to the horizontal plane or a horizontal direction (Y-direction) of the sample stage 4. In the following description, the predetermined frequency is referred to as an oscillation frequency.

The control device 7D includes a determination unit 42D, a driving control unit 43D, and a measurement unit 44.

The determination unit 42D performs a separation determination process of determining whether a probe 2a is separated from a sample surface, based on a first detection signal and a second detection signal which are output from a light detection unit 62. Specifically, the separation determination process of the determination unit 42D is to determine the separation of the probe 2a with respect to the sample surface, based on the change in amplitude of the oscillation frequency in the deflection direction or the twist direction of the cantilever 2.

The driving control unit 43D has the same function as that of the driving control unit 43B. Further, the driving control unit 43D controls the operation of the oscillation unit 3. That is, the driving control unit 43D controls relative vibration between the sample S and the cantilever 2.

Hereinafter, the separation determination process according to the fourth embodiment will be described with reference FIGS. 16A, 16B, 17A, 17B, 18A, and 18B.

For the separation determination process according to the fourth embodiment, there are roughly three methods of "a method of detecting a decrease amount of an amplitude in a non-resonant frequency in the deflection direction or the twist direction of the cantilever", "a method of detecting an increase amount of an amplitude in a resonant frequency in the deflection direction or the twist direction of the cantilever", and ""a method of detecting a decrease amount of an amplitude in the resonant frequency in the deflection direction or the twist direction of the cantilever."

Figure 16A:
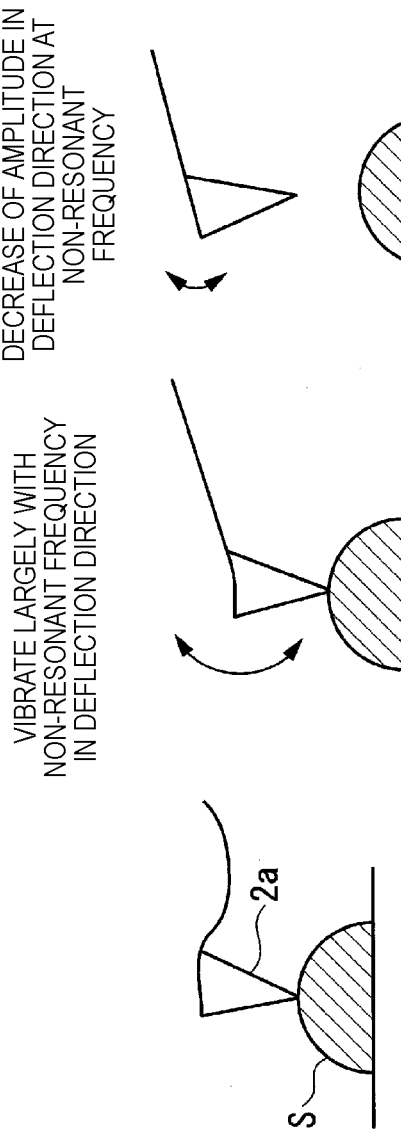
FIGS. 16A and 16B are diagrams illustrating a method of detecting a decrease amount of an amplitude in a non-resonant frequency in a deflection direction or a twist direction, in a cantilever according to the fourth embodiment (FIG. 16A shows a case of vibrating the cantilever in the deflection direction and FIG. 16B shows a case of vibrating the cantilever in the twist direction)
Figure 16B:
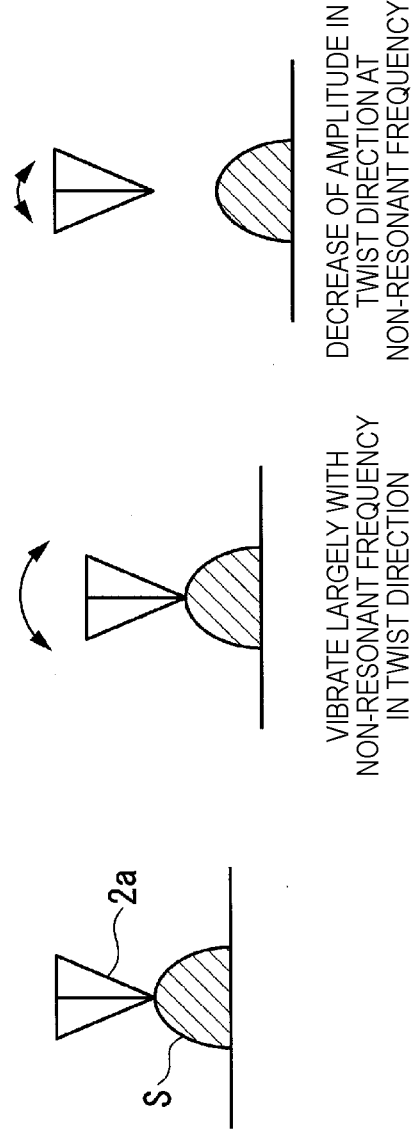

<Method of Detecting Decrease Amount of Amplitude at Non-Resonant Frequency in Deflection Direction or Twist Direction of Cantilever: FIGS. 16A and 16B>

In this method, the oscillation frequency is set to a non-resonant frequency of the cantilever 2. Then, the oscillation unit 3 slightly vibrates the sample S relative to the cantilever 2 at a non-resonant frequency in the separating operation. In this case, when the probe 2a is in contact with the surface of the sample, the angle of the cantilever 2 changes with the probe 2a as a fulcrum. That is, the angle change of the cantilever 2 is detected as large amplitude of the cantilever 2 in a detection method using an optical lever type.

On the other hand, when the probe 2a and the surface of the sample are separated from each other in the separating operation, since the probe 2a is away from the surface of the sample, the angle change of the cantilever 2 decreases. For this reason, the angle change of the cantilever is detected as small amplitude of the cantilever 2 in the detection method using the optical lever type. Therefore, in a case of moving from state where the probe 2a is in contact with the surface of the sample to the state where the probe 2a is separated from the surface of the sample, the amplitude of the cantilever 2 decreases. Here, the amplitude of the cantilever 2 is at least one of the amplitude in the deflection direction and the amplitude in the twist direction. The amplitude in the deflection direction is a deflection amount indicated by the first detection signal. The amplitude in the twist direction is a twist amount indicated by the second detection signal.

Therefore, the determination unit 42D determines that the probe 2a is separated from the surface of the sample when the decrease amount of the amplitude at the non-resonant frequency in the deflection direction or the twist direction of the cantilever 2 exceeds a predetermined value in the separating operation. In addition, the predetermined value is set based on the deflection amount or the twist amount detected in a state where the probe 2a is in contact with the surface of the sample in the separating operation.

In this method, it may slightly vibrate the cantilever 2 at the non-resonant frequency in the deflection direction, or may vibrate the cantilever 2 in the horizontal direction. In the fourth embodiment, it may slightly vibrate the sample S at the non-resonant frequency in the deflection direction, or may vibrate the sample S in the horizontal direction.

Figure 17A:
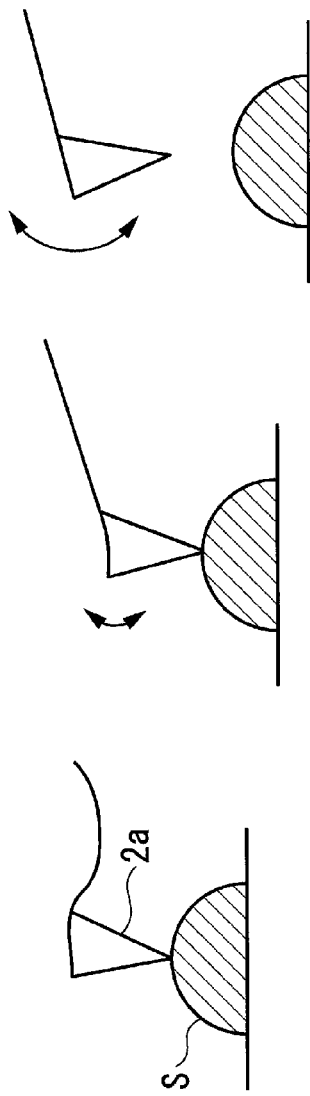
FIGS. 17A and 17B are diagrams illustrating a method of detecting an increase amount of an amplitude in a resonant frequency in a deflection direction or a twist direction in the cantilever according to the fourth embodiment (FIG. 17A shows a case of vibrating the cantilever in the deflection direction and FIG. 17B shows a case of vibrating the cantilever in the twist direction)
Figure 17B:
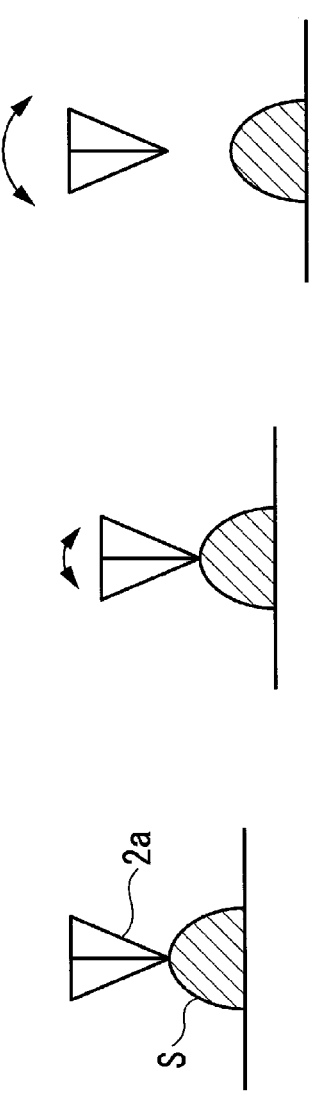

<Method of Detecting Increase Amount of Amplitude at Resonant Frequency in Deflection Direction or Twist Direction of Cantilever; FIGS. 17A and 17B>

In this method, the oscillation frequency is set to a cantilever resonant frequency. Then, the oscillation unit 3 slightly vibrates the sample S relative to the cantilever 2 at a cantilever resonant frequency in the separating operation. In this case, the cantilever 2 is in a doubly-supported state when the probe 2a is in contact with the surface of the sample. For this reason, even if being excited at the cantilever resonant frequency by the oscillation unit 3, the cantilever 2 does not resonate and vibrates with small amplitude.

On the other hand, when the probe 2a and the surface of the sample are separated from each other in the separating operation, since the probe 2a is away from the surface of the sample, the cantilever 2 is in a cantilever state. Therefore, the cantilever 2 resonates by being excited with the cantilever resonant frequency by the oscillation unit 3, and vibrates with large amplitude.

Therefore, in a case of moving from state where the probe 2a is in contact with the surface of the sample to the state where the probe 2a is separated from the surface of the sample, the amplitude of vibration of the cantilever 2 at the cantilever resonant frequency increases. Therefore, the determination unit 42D determines the separation of the probe 2a from the surface of the sample based on the increase in amplitude of the vibration of the cantilever 2 at the cantilever resonant frequency in the separation operation. For example, the determination unit 42D determines that the probe 2a is separated from the surface of the sample when the increase amount of the vibration amplitude of the cantilever 2 at the cantilever resonant frequency exceeds a predetermined value in the separating operation. In addition, the vibration amplitude of the cantilever 2 is at least one of the deflection amplitude and the twist amplitude.

In this method, it may slightly vibrate the cantilever 2 at the cantilever resonant frequency in the deflection direction, or may vibrate the cantilever 2 at the cantilever resonant frequency in the horizontal direction. In addition, it may slightly vibrate the sample S at the cantilever resonant frequency in the deflection direction, or may vibrate the sample S at the cantilever resonant frequency in the horizontal direction.

However, when the vibration slightly occurs in the deflection direction, the oscillation frequency is the cantilever resonant frequency of the cantilever 2 in the deflection direction. On the other hand, when the vibration slightly occurs in the horizontal direction, the oscillation frequency is the cantilever resonant frequency of the cantilever 2 in the horizontal direction.

<Method of Detecting Decrease Amount of Amplitude at Resonant Frequency in Deflection Direction or Twist Direction of Cantilever; FIGS. 18A and 18B>

In this method, the oscillation frequency is set to a doubly-supported-beam resonant frequency. Then, the oscillation unit 3 slightly vibrates the sample S relative to the cantilever 2 at the doubly-supported-beam resonant frequency in the separating operation. In this case, the cantilever 2 is in a doubly-supported state when the probe 2a is in contact with the surface of the sample. For this reason, the cantilever 2 resonates by being excited at the doubly-supported-beam resonant frequency by the oscillation unit 3, and vibrates with large amplitude.

On the other hand, when the probe 2a and the surface of the sample are separated from each other in the separating operation, since the probe 2a is away from the surface of the sample, the cantilever 2 is in a cantilever state. For this reason, even if being excited at the doubly-supported-beam resonant frequency by the oscillation unit 3, the cantilever 2 does not resonate and vibrates with small amplitude.

Therefore, in a case of moving from state where the probe 2a is in contact with the surface of the sample to the state where the probe 2a is separated from the surface of the sample, the amplitude of vibration of the cantilever 2 at the doubly-supported-beam resonant frequency decreases. Therefore, the determination unit 42D determines the separation of the probe 2a from the surface of the sample based on the decrease in amplitude of the vibration of the cantilever 2 at doubly-supported-beam resonant frequency in the separation operation. For example, the determination unit 42D determines that the probe 2a is separated from the surface of the sample when the decrease amount of the vibration amplitude of the cantilever 2 at the doubly-supported-beam resonant frequency exceeds a predetermined value in the separating operation. In addition, the vibration amplitude of the cantilever 2 is at least one of the deflection amplitude and the twist amplitude.

In this method, it may slightly vibrate the cantilever 2 at the doubly-supported-beam resonant frequency in the deflection direction, or may vibrate the cantilever 2 at the doubly-supported-beam resonant frequency in the horizontal direction. In addition, it may slightly vibrate the sample S at the doubly-supported-beam resonant frequency in the deflection direction, or may vibrate the sample S at the doubly-supported-beam resonant frequency in the horizontal direction.

However, when the vibration slightly occurs in the deflection direction, the oscillation frequency is the doubly-supported-beam resonant frequency of the cantilever 2 in the deflection direction. On the other hand, when the vibration slightly occurs in the horizontal direction, the oscillation frequency is the doubly-supported-beam resonant frequency of the cantilever 2 in the horizontal direction.

In any of the three types of separation determination processes according to the fourth embodiment, the separation of the probe 2a from the surface of the sample is determined under conditions that the deflection amount indicated by the first detection signal output from the light detection unit 62 is within a first range and the twist direction indicated by the second detection signal output from the light detection unit 62 is within a second range.

As described above, the scanning probe microscope D according to the fourth embodiment includes the oscillation unit 3 that relatively vibrates the sample S and the cantilever 2 at a predetermined frequency in the separating operation and the determination unit 42D that determines the separation of the probe 2a from the surface of the sample based on the change in amplitude at the predetermined frequency in the deflection direction or the twist direction of the cantilever 2 during the separating operation. Accordingly, since the scanning probe microscope D is operated at the optimal separation distance at the respective measuring points of the sample S even in a case where there is the adsorption power between the probe 2a and sample S, it is possible to achieve the measurement of the uneven shape in the sample surface in the shortest time. Therefore, the scanning probe microscope D is possible to improve the measurement efficiency of the uneven shape in the sample surface.

In the fourth embodiment, the method of slightly vibrating at the non-resonate frequency in the deflection or twist direction is suitable for the case where the amplitude sharply decreases at the moment the probe 2a separates from the surface of the sample, the response is fast, and the operation is performed at a high speed.

On the other hand, the method of adding minute amplitude to the resonant frequency (cantilever resonant frequency, doubly-supported-beam resonant frequency) makes it possible to detect with the amplitude smaller than the non-resonant frequency, so it has little influence on the measurement of the uneven shape.

Fifth Embodiment

Hereinafter, the scanning probe microscope E according to a fifth embodiment will be described with reference to the drawings. The scanning probe microscope E according to the fifth embodiment includes an oscillation unit 3 as in the fourth embodiment and performs a separation determination process based on a phase difference between a phase of vibration in a deflection direction or a twist direction of the cantilever 2 and a phase of a resonant frequency excited by the oscillation unit 3, unlike the "separation determination process" according to the first embodiment. As a "contact determination process", the scanning probe microscope E according to the fifth embodiment performs the same process as the "contact determination process" according to the first embodiment.

Figure 19:
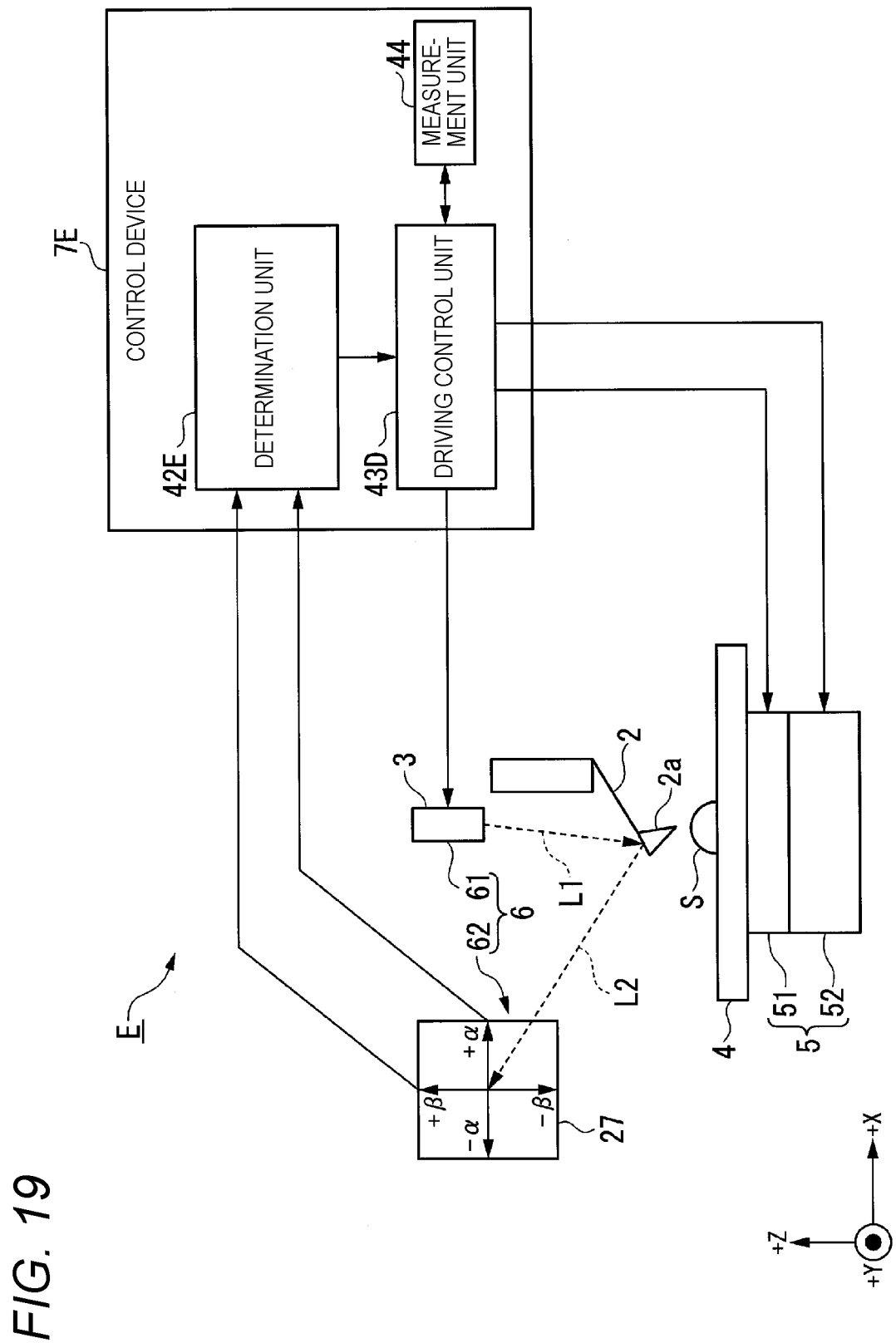
FIG. 19 is a diagram showing an example of a schematic configuration of a scanning probe microscope E according to a fifth embodiment.

FIG. 19 is a diagram showing an example of a schematic configuration of the scanning probe microscope E according to the fifth embodiment. As shown in FIG. 19, the scanning probe microscope E includes a cantilever 2, an oscillation unit 3, a sample stage 4, a movement driving unit 5, a displacement detecting unit 6, and a control device 7E.

The control device 7E includes a determination unit 42E, a driving control unit 43D, and a measurement unit 44.

The determination unit 42E performs a separation determination process of determining whether a probe 2a is separated from a sample surface, based on a first detection signal and a second detection signal which are output from a light detection unit 62. Specifically, the separation determination process of the determination unit 42E is to determine the separation of the probe 2a with respect to the sample surface, based on the phase difference between the phase of vibration in the deflection direction or the twist direction of the cantilever 2 and the phase of the resonant frequency excited by the oscillation unit 3.

Figure 20A:
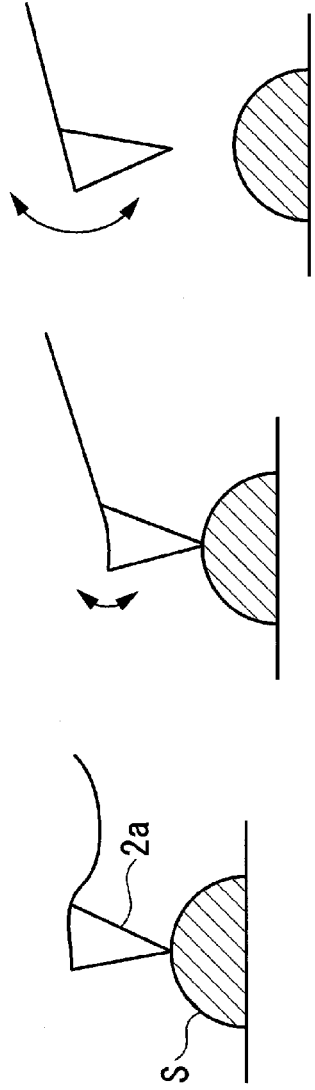
FIGS. 20A and 20B are diagrams illustrating a separation determination process according to the fifth embodiment.
Figure 20B:
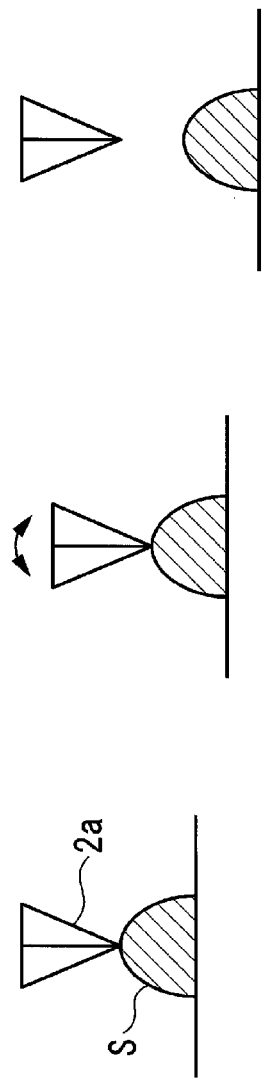

Hereinafter, the separation determination process according to the fifth embodiment will be described with reference FIGS. 20A and 20B.

In this method, the oscillation frequency is set to a cantilever resonant frequency. Then, the oscillation unit 3 causes the sample S and the cantilever 2 to slightly vibrate relatively to each other at a cantilever resonant frequency in the separating operation. In this case, the cantilever 2 is both-end supported in the state where the probe 2a is in contact with the surface of the sample. For this reason, even if being excited at the cantilever resonant frequency by the oscillation unit 3, the cantilever 2 does not resonate and vibrates with non-resonance. Therefore, the phase difference between the phase of vibration in the cantilever 2 and the phase of the oscillation frequency excited by the oscillation unit 3 is small.

On the other hand, when the probe 2a and the surface of the sample are separated from each other in the separating operation, since the probe 2a is away from the surface of the sample, the cantilever 2 is in a cantilever state. Therefore, the cantilever 2 resonates by being excited with the cantilever resonant frequency by the oscillation unit 3. Accordingly, the phase difference between the phase of vibration in the cantilever 2 and the phase of the oscillation frequency excited by the oscillation unit 3 is approximately 90 degrees. That is, the phase of vibration in the cantilever 2 has a phase delayed by 90 degrees from the phase of the oscillation frequency excited by the oscillation unit 3.

Therefore, in a case of moving from state where the probe 2a is in contact with the surface of the sample to the state where the probe 2a is separated from the surface of the sample, the phase difference between the phase of vibration in the cantilever 2 and the phase of the oscillation frequency excited by the oscillation unit 3 increases. Therefore, the determination unit 42E determines the separation of the probe 2a from the surface of the sample based on the phase difference between the phase of vibration in the deflection direction or the twist direction of the cantilever 2 and the phase of the resonant frequency excited by the oscillation unit 3 in the separation operation. For example, the determination unit 42E determines that the probe 2a is separated from the surface of the sample when the phase difference between the phase of vibration in the deflection direction or the twist direction of the cantilever 2 and the phase of the resonant frequency excited by the oscillation unit 3 exceeds a predetermined value in the separating operation.

In this method, it may slightly vibrate the cantilever 2 at the cantilever resonant frequency in the deflection direction, or may vibrate the cantilever 2 at the cantilever resonant frequency in the horizontal direction. In addition, it may slightly vibrate the sample S at the cantilever resonant frequency in the deflection direction, or may vibrate the sample S at the cantilever resonant frequency in the horizontal direction.

However, when the vibration slightly occurs in the deflection direction, the oscillation frequency is the cantilever resonant frequency of the cantilever 2 in the deflection direction. On the other hand, when the vibration slightly occurs in the horizontal direction, the oscillation frequency is the cantilever resonant frequency of the cantilever 2 in the horizontal direction.

In the separation determination process according to the fifth embodiment, the separation of the probe 2a from the surface of the sample is determined under conditions that the deflection amount indicated by the first detection signal output from the light detection unit 62 is within a first range and the twist direction indicated by the second detection signal output from the light detection unit 62 is within a second range.

As described above, the scanning probe microscope E according to the fifth embodiment includes the oscillation unit 3 that relatively vibrates the sample S and the cantilever 2 at a predetermined frequency in the separating operation and the determination unit 42E that determines the separation of the probe 2a from the surface of the sample based on the phase difference between the phase of vibration in the deflection direction or the twist direction of the cantilever 2 and the phase of the resonant frequency excited by the oscillation unit 3 during the separating operation. Accordingly, since the scanning probe microscope E is operated at the optimal separation distance at the respective measuring points of the sample S even in a case where there is the adsorption power between the probe 2a and sample S, it is possible to achieve the measurement of the uneven shape in the sample surface in the shortest time. Therefore, the scanning probe microscope E is possible to improve the measurement efficiency of the uneven shape in the sample surface.

As described above, the scanning probe microscope according to one embodiment of the present disclosure does not determine whether the probe 2a is separated from the surface of the sample by separating it from the surface of the sample by a preset "separation distance" as in the related art, but determines whether the probe 2a and the surface of the sample are separated from each other while performing the separating operation. When it is determined that the probe and the surface of the sample are separated from each other, the separating operation is stopped. Then, the scanning probe microscope allows the probe to move to the position above the next measuring point after stopping the separating operation.

Here, when the deflection amount and the twist amount of the cantilever 2 are within the predetermined range during the separating operation, a method may be considered in which it is determined that the probe 2a is not in contact with the surface of the sample, that is, the probe 2a and the surface of the sample are separated from each other. In this method, however, even when the deflection amount and the twist amount of the cantilever 2 are within the predetermined range, the probe 2a and the surface of the sample may be in contact with each other due to the adsorption power, and thus it is not possible to correctly detect that the probe and the surface of the sample are separated from each other.

On the other hand, according to the scanning probe microscope of one embodiment of the present disclosure, it is possible to reliably detect the separation of the probe 2a from the surface of the sample by applying the separation determination process according to any one of the first to fifth embodiments during the separating operation.

According to the above-described scanning probe microscope, it is possible to avoid the probe 2a from colliding with the sample by executing the separation determination process according to any one of the first to fifth embodiments during the separating operation in the movement up to the position above the next measuring point after stopping the separating operation.

For example, according to the above-described scanning probe microscope, (1) the approaching operation is performed, and (2) it is determined whether the probe 2a and the surface of the sample are in contact with each other. According to the scanning probe microscope, when it is determining that the probe 2a and the surface of the sample are in contact with each other, (3) the approaching operation is stopped and the relative distance is measured. Then, according to the scanning probe microscope, after the relative distance is measured, and (4) the separating operation is started and whether the probe 2a and the surface of the sample are separated from each other is determined in the separation determination process according to any one of the first to fifth embodiments during the separating operation. Then, according to the scanning probe microscope, (5) when it is determined that the probe 2a and the surface of the sample are separated from each other, the separating operation is stopped, and (6) the probe 2a is moved up to the position above the next measuring point. Here, the scanning probe microscope determines in the separation determination process according to any one of the first to fifth embodiments whether the probe 2a and the surface of the sample are separated from each other while moving the probe 2a to the position above the next measuring point. Then, the scanning probe microscope continues the movement when it is determined that the probe 2a and the surface of the sample are separated from each other, and when the probe 2a and the surface of the sample are not in contact with each other, returns to (5) described above to execute the separating operation and start the separation determination process according to any one of the first to fifth embodiments.

Thus, the scanning probe microscope according to the embodiments of the present disclosure can avoid the probe 2a from colliding with the sample in the movement to the position above the next measuring point.

In the separating operation of the first to fifth embodiments, the sample S is moved in the direction being separated from the probe 2a. The probe 2a may be moved in a direction being separated from the sample S in the separating operation.

The control devices 7, and 7B to 7E in the above-described embodiments may be implemented by a computer. In this case, it may be realized by recording a program for achieving the functions thereof on a computer-readable recording medium and causing a computer system to read and execute the program recorded on the recording medium. It is to be noted that the "computer system" used here is assumed to include an OS and hardware such as peripheral devices. In addition, the "computer-readable recording medium" refers to a portable medium such as a flexible disk, a magneto-optical disc, a ROM, or a CD-ROM, and a storage apparatus such as a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system serving as a server or a client. In addition, the above program may realize part of the above-described functions, it may implement the above-described functions in combination with a program already recorded on the computer system, or the above-described functions may be implemented using a programmable logic device such as a field programmable gate array (FPGA).

Although the embodiments of the present disclosure have been described in detail with reference to the drawings, the specific configurations are not limited to the embodiments and designs and the like may also be included without departing from the gist of the present disclosure.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described with reference to phrases such as "first" or "next" in the claims, embodiments, or diagrams, it does not necessarily mean that the process must be performed in this order.

What is claimed is:

1. A scanning probe microscope in which a probe is brought into contact with a surface of a sample and the probe intermittently scans the surface of the sample, comprising:
   a cantilever having the probe at a tip of the cantilever;
   a driving unit configured to perform a separating operation for separating one of the sample and the probe from the other in a direction that the sample and the probe come apart each other, at a speed exceeding a response speed of the cantilever, from a state where the probe is in contact with the surface of the sample;
   a determination unit configured to determine that the probe is separated from the surface of the sample in a case where vibration of the cantilever at a predetermined amplitude is detected at a resonant frequency of the cantilever during the separating operation; and
   a driving control unit configured to stop the separating operation by the driving unit at a moment of time when the determination unit determines that the probe is separated from the surface of the sample and relatively move the probe and the sample to a position where the probe is located on a next measuring point of the sample.

2. The scanning probe microscope according to claim 1, wherein the predetermined amplitude is a range smaller than displacement of the cantilever in a state where the probe is in contact with the surface of the sample, with reference to an amplitude due to thermal vibration in a state where no force is applied to the cantilever.

3. A scanning probe microscope in which a probe is brought into contact with a surface of a sample and the probe scans the surface of the sample, comprising:
   a cantilever having the probe at a tip of the cantilever;
   a driving unit configured to perform a separating operation for separating one of the sample and the probe from the other in a direction that the sample and the probe come apart each other, at a speed not exceeding a response speed of the cantilever, from a state where the probe is in contact with the surface of the sample;
   a determination unit configured to determines separation of the probe with respect to the surface of the sample, based on a speed change in a deflection direction of the cantilever, during the separating operation; and
   a driving control unit configured to stop the separating operation by the driving unit at a moment of time when the determination unit determines that the probe is separated from the surface of the sample and relatively move the probe and the sample to a position where the probe is located on a next measuring point of the sample.

4. The scanning probe microscope according to claim 3, wherein the determination unit determines that the probe is separated from the surface of the sample in a case where a speed in the deflection direction of the cantilever reaches to a value equal to or less than a predetermined value.

5. The scanning probe microscope according to claim 3, wherein the determination unit determines that the probe is separated from the surface of the sample in a case where a speed direction of the cantilever is reversed.

6. A scanning probe microscope in which a probe is brought into contact with a surface of a sample and the probe intermittently scans the surface of the sample, comprising:
   a cantilever having the probe at a tip of the cantilever;
   a driving unit configured to perform a separating operation for separating one of the sample and the probe from the other, from a state where the probe is in contact with the surface of the sample;
   a determination unit configured to determine separation of the probe with respect to the surface of the sample, based on a change in amplitude of vibration in the cantilever or a change in vibration frequency of the vibration, during the separating operation; and
   a driving control unit configured to stop the separating operation by the driving unit at a moment of time when the determination unit determines that the probe is separated from the surface of the sample and relatively move the probe and the sample to a position where the probe is located on a next measuring point of the sample.

7. A scanning probe microscope in which a probe is brought into contact with a surface of a sample and the probe intermittently scans the surface of the sample, comprising:
   a cantilever having the probe at a tip of the cantilever;
   a driving unit configured to perform a separating operation for separating one of the sample and the probe from the other, from a state where the probe is in contact with the surface of the sample;
an oscillation unit configured to relatively vibrate the sample and the cantilever at a predetermined frequency during the separating operation;
a determination unit configured to determine separation of the probe with respect to the surface of the sample, based on a change in amplitude at the predetermined frequency in a deflection direction or a twist direction of the cantilever, during the separating operation; and
a driving control unit configured to stop the separating operation by the driving unit at a moment of time when the determination unit determines that the probe is separated from the surface of the sample and relatively move the probe and the sample to a position where the probe is located on a next measuring point of the sample.

8. The scanning probe microscope according to claim 7, wherein the predetermined frequency is a non-resonant frequency of the cantilever, and
the determination unit determines that the probe is separated from the surface of the sample in a case where a decrease amount of the amplitude at the non-resonant frequency in the deflection direction or the twist direction of the cantilever during the separating operation exceeds a predetermined value.

9. The scanning probe microscope according to claim 7, wherein the predetermined frequency is a resonant frequency of the cantilever in a state where the cantilever is in contact with the sample, and
the determination unit determines that the probe is separated from the surface of the sample in a case where a decrease amount of the amplitude in the deflection direction or the twist direction of the cantilever during the separating operation exceeds a predetermined value.

10. The scanning probe microscope according to claim 7, wherein the predetermined frequency is a resonant frequency of the cantilever, and
the determination unit determines that the probe is separated from the surface of the sample in a case where an increase amount of the amplitude at the resonant frequency in the deflection direction or the twist direction of the cantilever during the separating operation exceeds a predetermined value.

11. A scanning probe microscope in which a probe is brought into contact with a surface of a sample and the probe intermittently scans the surface of the sample, comprising:
a cantilever having the probe at a tip of the cantilever;
a driving unit configured to perform a separating operation for separating one of the sample and the probe from the other, from a state where the probe is in contact with the surface of the sample;
an oscillation unit configured to excites the cantilever at a resonant frequency during the separating operation;
a determination unit configured to determine separation of the probe with respect to the surface of the sample, based on a phase difference between a phase of vibration in a deflection direction or a twist direction of the cantilever and a phase of the resonant frequency excited by the oscillation unit, during the separating operation; and
a driving control unit configured to stop the separating operation by the driving unit at a moment of time when the determination unit determines that the probe is separated from the surface of the sample and relatively move the probe and the sample to a position where the probe is located on a next measuring point of the sample.

12. A probe scanning method of a scanning probe microscope in which a probe is brought into contact with a surface of a sample and the probe intermittently scans the surface of the sample, the method comprising:
a driving step, in a cantilever having the probe at a tip of the cantilever, of performing a separating operation for separating one of the sample and the probe from the other in a direction that the sample and the probe come apart each other, at a speed exceeding a response speed of the cantilever, from a state where the probe is in contact with the surface of the sample;
a determining step of determining that the probe is separated from the surface of the sample in a case where vibration of the cantilever at a predetermined amplitude is detected at a resonant frequency of the cantilever during the separating operation; and
a driving control step of stopping the separating operation by the driving step at a moment of time when it is determined in the determining step that the probe is separated from the surface of the sample and relatively moving the probe and the sample to a position where the probe is located on a next measuring point of the sample.

13. The probe scanning method according to claim 12, wherein the driving control step includes a step of determining whether the probe and the surface of the sample are separated from each other in a case of relatively moving the probe and the sample to a position where the probe is located on a next measuring point of the sample.

14. A probe scanning method of a scanning probe microscope in which a probe is brought into contact with a surface of a sample and the probe scans the surface of the sample, the method comprising:
a driving step, in a cantilever having the probe at a tip of the cantilever, of performing a separating operation for separating one of the sample and the probe from the other in a direction that the sample and the probe come apart each other, at a speed not exceeding a response speed of the cantilever, from a state where the probe is in contact with the surface of the sample;
a determining step of determining separation of the probe with respect to the surface of the sample, based on a speed change in a deflection direction of the cantilever, during the separating operation; and
a driving control step of stopping the separating operation by the driving step at a moment of time when it is determined in the determining step that the probe is separated from the surface of the sample and relatively moving the probe and the sample to a position where the probe is located on a next measuring point of the sample.

15. The probe scanning method according to claim 14, wherein the driving control step includes a step of determining whether the probe and the surface of the sample are separated from each other in a case of relatively moving the probe and the sample to a position where the probe is located on a next measuring point of the sample.

* * * * *